US011709637B2

(12) United States Patent
Kamata

(10) Patent No.: US 11,709,637 B2
(45) Date of Patent: Jul. 25, 2023

(54) IMAGE FORMING SYSTEM FOR INSPECTING IMAGE FORMED ON SHEET

(71) Applicant: CANON KABUSHIKI KAISHA, Tokyo (JP)

(72) Inventor: Yusuke Kamata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/725,706

(22) Filed: Apr. 21, 2022

(65) Prior Publication Data

US 2022/0350549 A1    Nov. 3, 2022

(30) Foreign Application Priority Data

Apr. 28, 2021   (JP) .................................. 2021-076557
Mar. 4, 2022    (JP) .................................. 2022-033789

(51) Int. Cl.
*G06F 3/12*   (2006.01)
*H04N 1/00*   (2006.01)

(52) U.S. Cl.
CPC .......... *G06F 3/1208* (2013.01); *G06F 3/1252* (2013.01); *G06F 3/1258* (2013.01); *H04N 1/0044* (2013.01)

(58) Field of Classification Search
CPC .... G06F 3/1208; G06F 3/1252; G06F 3/1258; H04N 1/6094; H04N 1/0044
See application file for complete search history.

(56) References Cited

U.S. PATENT DOCUMENTS

| 2013/0148863 | A1* | 6/2013 | Muraishi | G06V 30/40 |
| | | | | 382/112 |
| 2020/0233618 | A1* | 7/2020 | Ayukawa | G06F 3/1208 |
| 2021/0389712 | A1* | 12/2021 | Ueda | G03G 15/5029 |
| 2022/0070322 | A1* | 3/2022 | Ogawa | H04N 1/3878 |

FOREIGN PATENT DOCUMENTS

| JP | H01-147562 A | 6/1989 |
| JP | 2007241413 A | 9/2007 |
| JP | 2020120160 A | 8/2020 |

OTHER PUBLICATIONS

Extended European Search Report dated Sep. 28, 2022, issued in corresponding European Patent Application No. 22167303.1.

* cited by examiner

*Primary Examiner* — Iriana Cruz
(74) *Attorney, Agent, or Firm* — Venable LLP

(57) ABSTRACT

An image forming system executes determination processing with an intensity of an image editing process being a first intensity and a determination threshold being a first value and does not execute the determination processing with the intensity of the image editing process being the first intensity and the determination threshold being a second value. The system executes the determination processing with the intensity of the image editing process being a second intensity greater than the first intensity and the determination threshold being the first value and does not execute the determination processing with the intensity of the image editing process being the second intensity and the determination threshold being the second value.

27 Claims, 22 Drawing Sheets

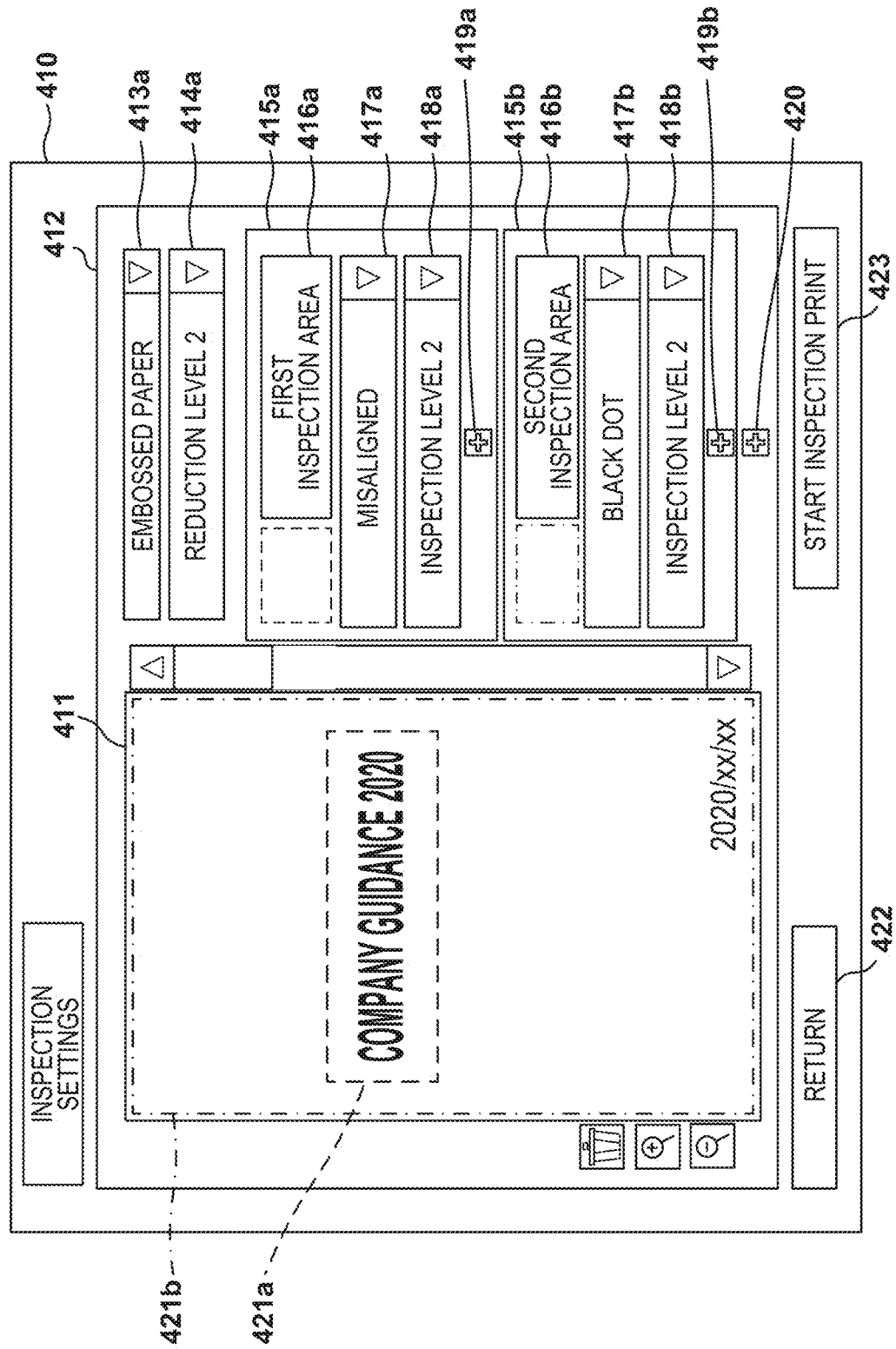

FIG. 6A

| | INSPECTION MATTER: BLACK DOT | | |
|---|---|---|---|
| INSPECTION LEVEL / REDUCTION LEVEL | 1 | 2 | 3 |
| 1 | OK | NG | NG |
| 2 | OK | NG | NG |
| 3 | OK | OK | OK |

FIG. 6B

| | INSPECTION MATTER: MISALIGNMENT | | |
|---|---|---|---|
| INSPECTION LEVEL / REDUCTION LEVEL | 1 | 2 | 3 |
| 1 | OK | NG | NG |
| 2 | OK | OK | NG |
| 3 | OK | OK | OK |

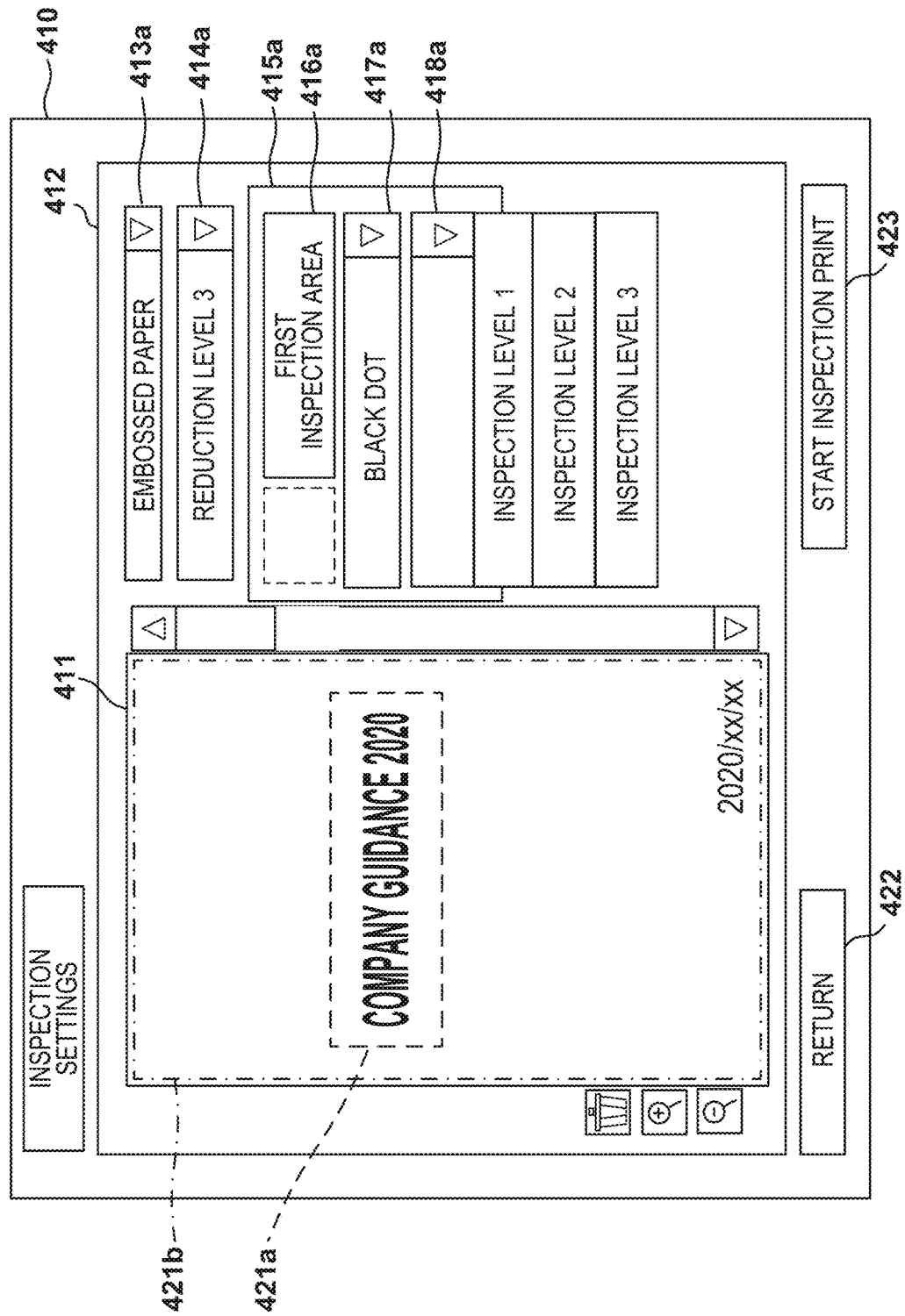

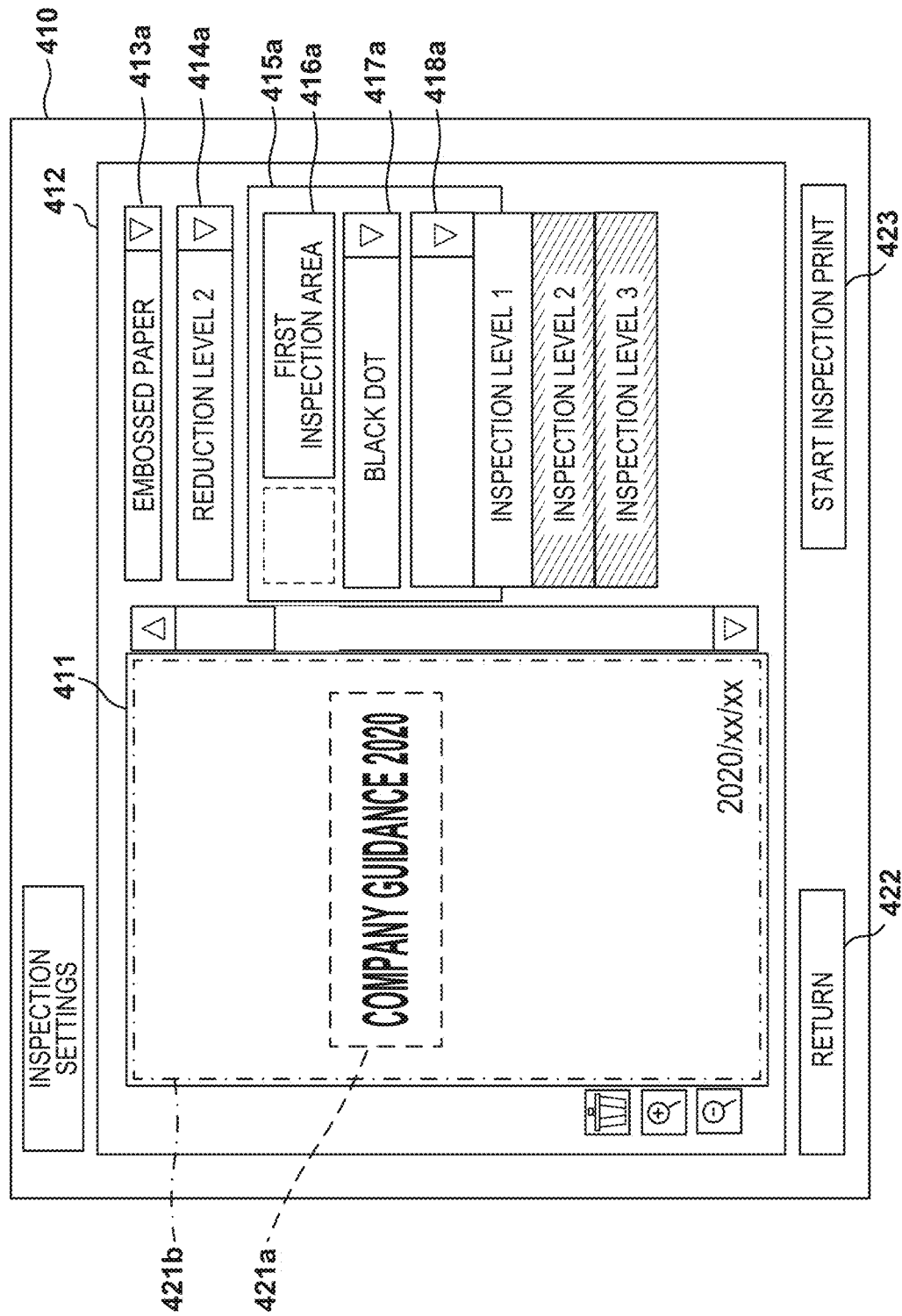

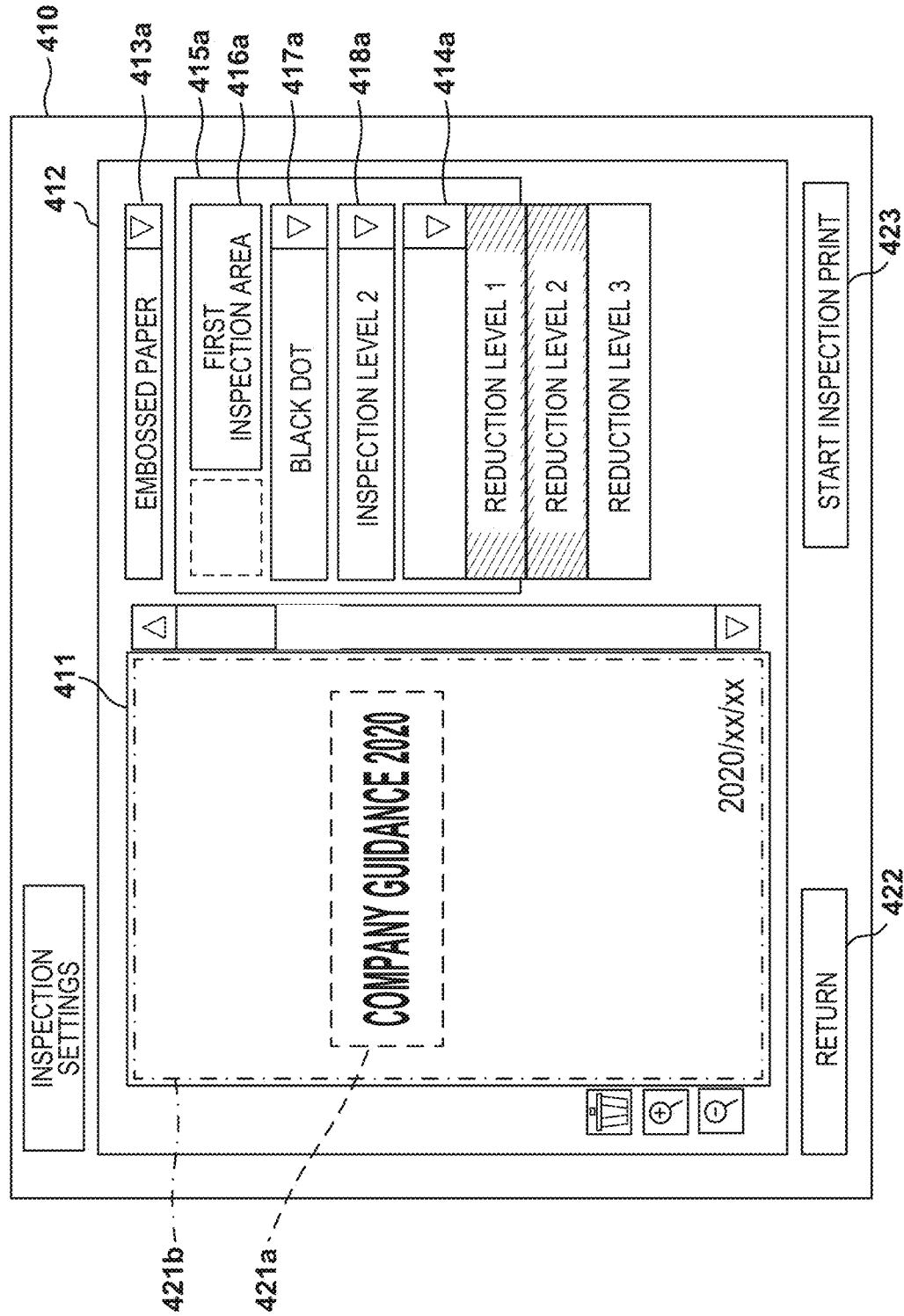

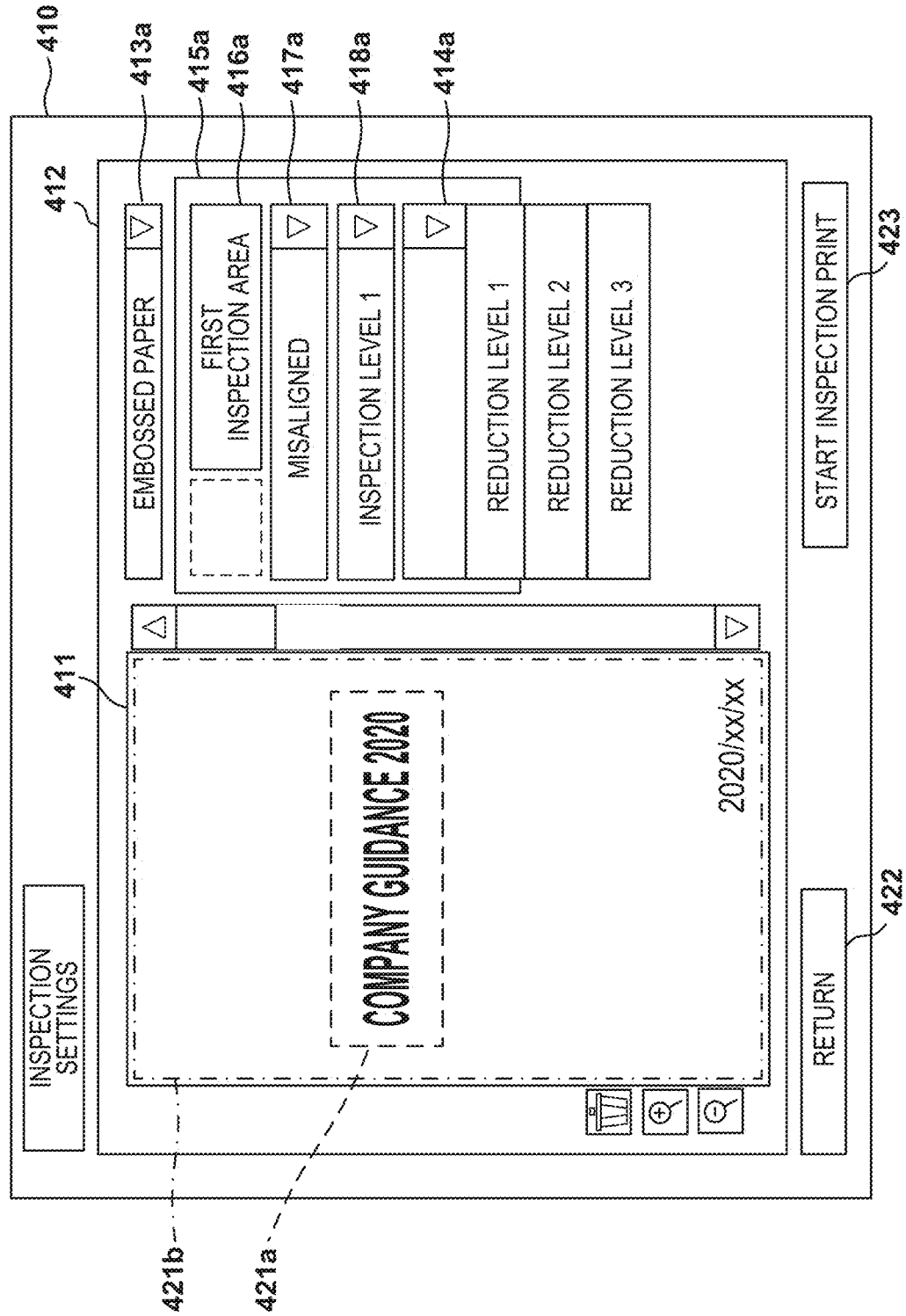

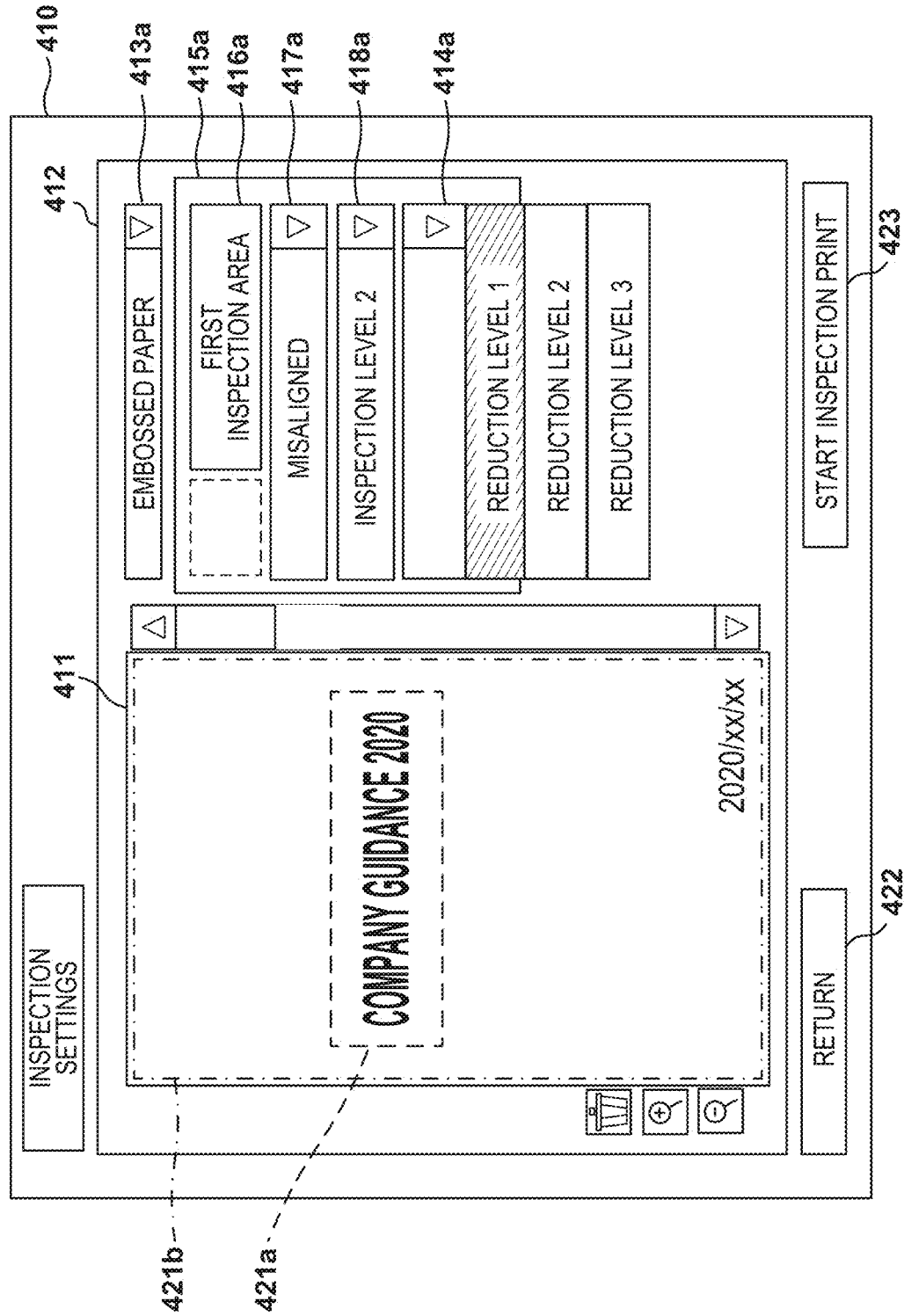

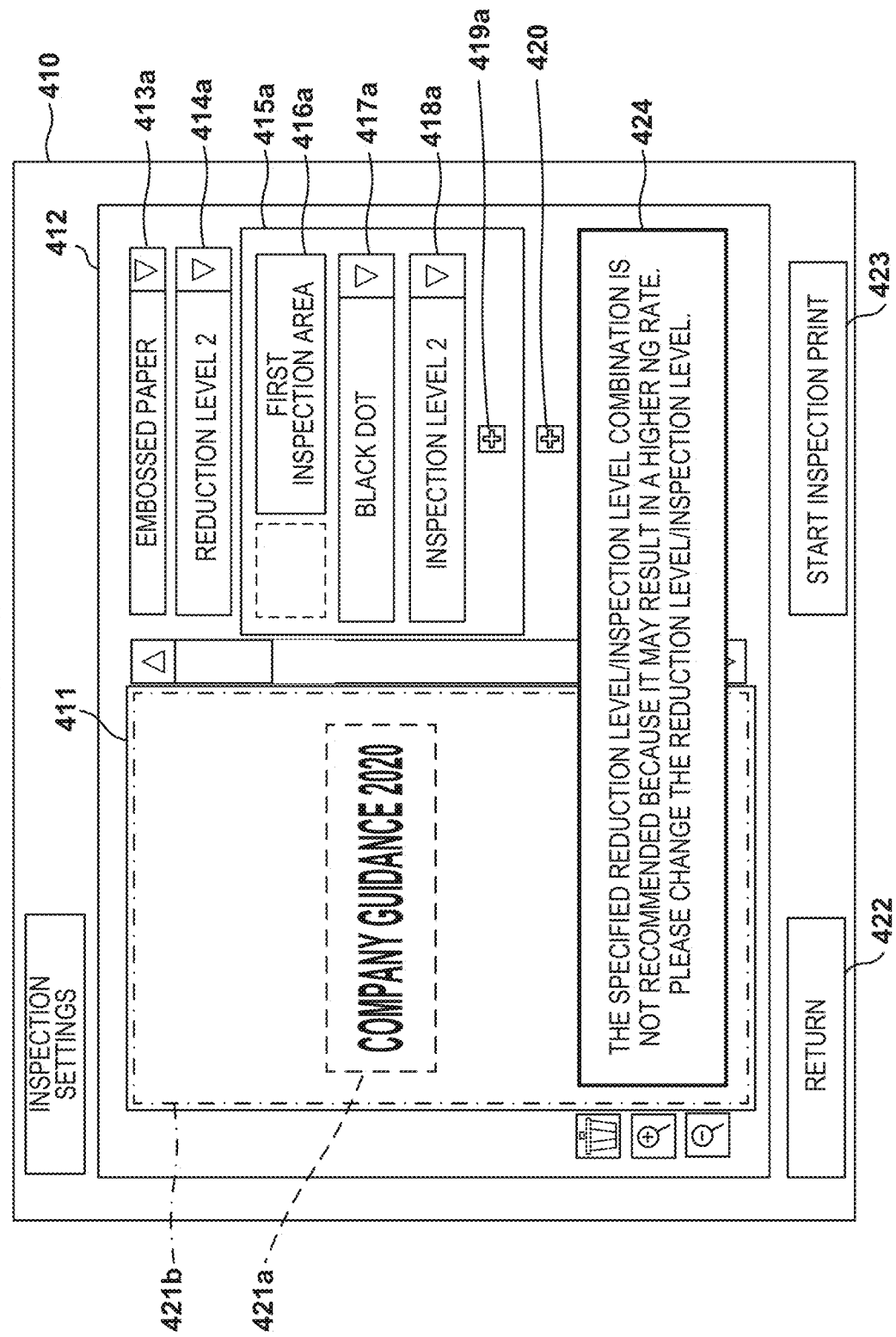

IMAGE FORMING SYSTEM FOR INSPECTING IMAGE FORMED ON SHEET

CROSS REFERENCE TO PRIORITY APPLICATIONS

This application claims the benefit of Japanese Patent Application No. 2021-076557, filed Apr. 28, 2021, and Japanese Patent Application No. 2022-033789, filed Mar. 4, 2022, which are hereby incorporated by reference herein in their entirety.

BACKGROUND OF THE INVENTION

Field of the Invention

The present invention relates to an image forming system and an image inspection system for inspecting an image formed on a sheet.

Description of the Related Art

The demand is increasing for inspecting the quality of an image formed on a sheet. According to Japanese Patent Laid-Open No. 2007-241413, an image can be determined to be a pass or fail by comparing original document image data and a reading result of an image formed on a sheet. In this manner, it is important to find sheets that do not satisfy the pass criterion. However, it is also important to reduce the number of erroneous determinations of a fail (erroneous determination) of sheets that do satisfy the pass criterion. According to Japanese Patent Laid-Open No. 2020-120160, because embossed paper or sheets with punched holes often result in an erroneous fail determination, these are excluded from being the target of inspection.

In the related art, because embossed paper and the like cause erroneous determinations, the quality of an image formed on embossed paper cannot be inspected. By using the appropriate settings for such types of sheets, erroneous determination in image inspection can be reduced.

SUMMARY OF THE INVENTION

The present invention may provide an image forming system comprising an image forming unit configured to form an image on a sheet, a reading unit provided downstream of the image forming unit in a conveyance direction in which the sheet is conveyed, the reading unit being configured to read an image on the sheet conveyed from the image forming unit, and one or more processors configured to generate image data representing a result of the reading unit reading an image on the sheet, to set an intensity of an image editing process applied to the image data, and to execute determination processing, on the basis of a determination threshold, to determine a degree of match between an image corresponding to reference data and an image corresponding to the image data on which the image editing process has been applied, the reference data being image data corresponding to a determination reference used in the determination processing and the determination threshold being set by the one or more processors wherein the one or more processors execute the determination processing with the intensity of the image editing process being a first intensity and the determination threshold being a first value and do not execute the determination processing with the intensity of the image editing process being the first intensity and the determination threshold being a second value less than the first value and wherein the one or more processors execute the determination processing with the intensity of the image editing process being a second intensity greater than the first intensity and the determination threshold being the first value and do not execute the determination processing with the intensity of the image editing process being the second intensity and the determination threshold being the second value.

Further features of the present invention will become apparent from the following description of exemplary embodiments (with reference to the attached drawings).

BRIEF DESCRIPTION OF THE DRAWINGS

FIGS. 4A and 4B are diagrams for describing a print settings screen and inspection settings.

FIGS. 6A and 6B are diagrams for describing a determination table.

FIGS. 7A and 7B are diagrams for describing inspection settings.

FIGS. 14A and 14B are diagrams for describing inspection settings.

FIGS. 15A and 15B are diagrams for describing inspection settings.

FIG. 17 is a diagram for describing inspection settings.

DESCRIPTION OF THE EMBODIMENTS

Figure 1:
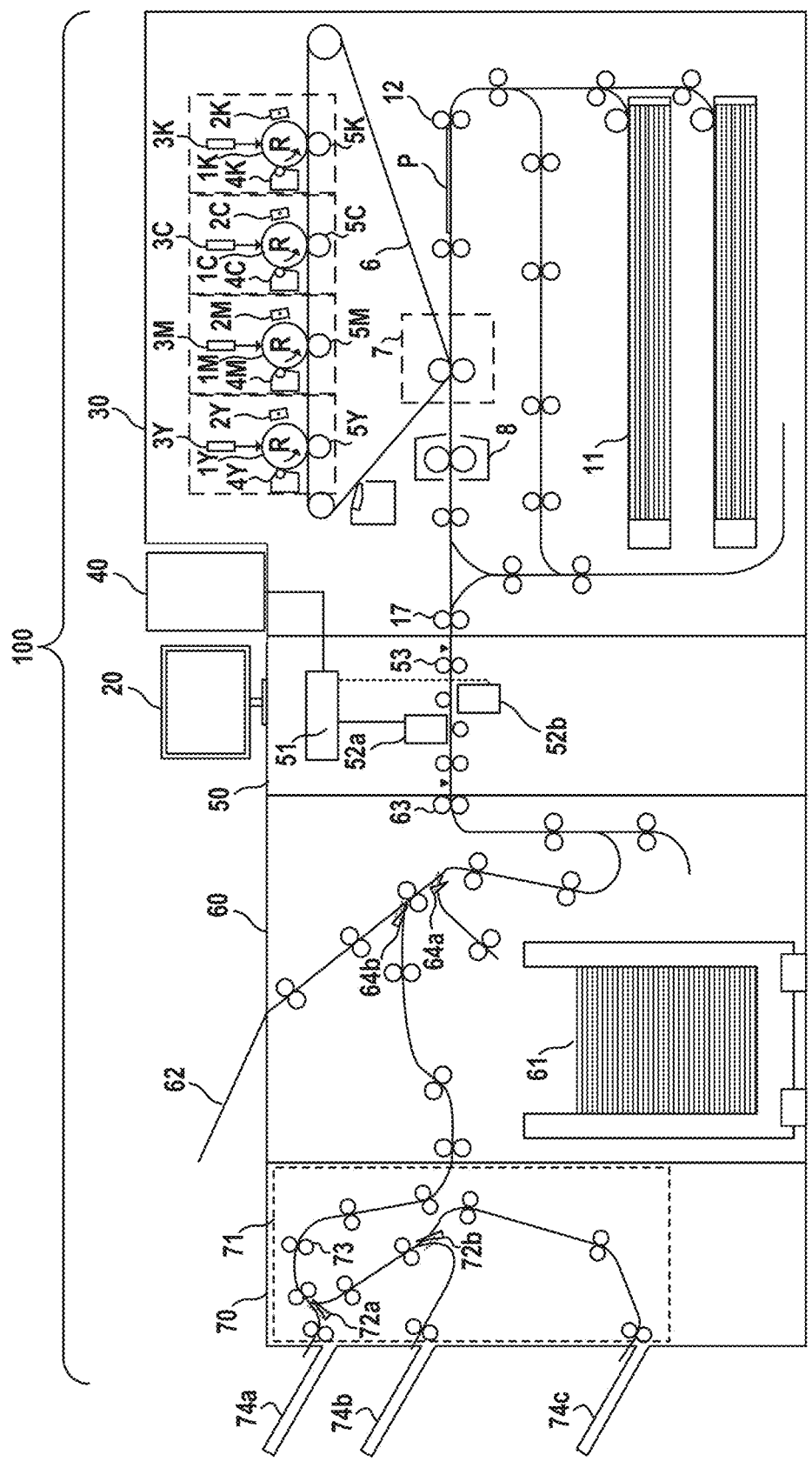
FIG. 1 is a diagram for describing an image inspection system.

Hereafter, embodiments will be described in detail with reference to the attached drawings. Note, the following embodiments are not intended to limit the scope of the claimed invention. Multiple features are described in the embodiments, but limitation is not made on an invention that requires all such features, and multiple such features may be combined as appropriate. Furthermore, in the attached drawings, the same reference numerals are given to the same or similar configurations, and redundant description thereof is omitted.

First Embodiment

System Configuration

As illustrated in FIG. 1, an image inspection system 100 includes a console unit 20, an image forming apparatus 30, a control apparatus 40, an image inspection apparatus 50, a loading apparatus 60, and a post-processing apparatus 70. The console unit 20 includes a display apparatus that outputs information to a user and an input apparatus (for example, a touch panel sensor) that receives instructions from a user.

The image forming apparatus 30 forms a toner image on the sheet P in accordance with a YMCK color signal supplied from the control apparatus 40. The characters YMCK assigned to reference signs indicate the toner colors of yellow, magenta, cyan, and black. When describing an item in common between the four colors, the characters YMCK are omitted from the reference signs.

A photosensitive member 1 is an image carrier that carries an electrostatic latent image or a toner image. A charging device 2 uniformly charges the surface of the photosensitive member 1. An exposure device 3 forms an electrostatic latent image by irradiating the photosensitive member 1Y with a laser beam in accordance with the color signal supplied from the control apparatus 40. A developing device 4 develops the electrostatic latent image using the toner and forms a toner image. A primary transfer roller 5Y transfers the toner image from the photosensitive member 1 to an intermediate transfer belt 6. Here, the YMCK toner images are superimposed to form a color image. The intermediate transfer belt 6 conveys the toner image to a secondary transfer unit 7.

A sheet cassette 11 is a housing case that houses and stores a plurality of the sheets P. The sheet P may be plain paper or may be embossed paper or the like with recesses and protrusions on the surface. A conveyance roller 12 feeds the sheet P housed in the sheet cassette 11 and conveys the sheet P along a conveyance path.

The secondary transfer unit 7 transfers the toner image from the intermediate transfer belt 6 to the sheet P. A fixing device 8 applies heat and pressure to the sheet P and the toner image, and fixes the toner image on the sheet P. A discharge roller 17 discharges the sheet P to the image inspection apparatus 50.

The image inspection apparatus 50 is an apparatus that inspects the quality of the image formed on the sheet P. An inspection controller 51 inspects the image on the sheet P read using an image sensor 52*a* and an image sensor 52*b* while the sheet P is being conveyed by a conveyance roller 53. The image sensors 52*a* and 52*b* each includes a light source that illuminates the sheet P and a complementary metal-oxide-semiconductor (CMOS) sensor. The inspection controller 51 passes the inspection result to the control apparatus 40. The image inspection apparatus 50 discharges the sheet P to the loading apparatus 60. Note that the control apparatus 40 controls the image forming apparatus 30 so that the same image in formed on a new sheet P in the case of the sheet P being determined to be a defect (fail) by the image inspection apparatus 50.

The loading apparatus 60 conveys the sheet P via a conveyance roller 63. The loading apparatus 60 includes a defect tray 62 and a large capacity tray 61. The defect tray 62, for example, is loaded with the sheets P that are determined to have failed in terms of image quality by the image inspection apparatus 50. The large capacity tray 61 is a sheet loading unit that is able to be loaded with a plurality of the sheets P. The loading apparatus 60 includes flappers 64*a* and 64*b* for switching the destination of the sheet P. The control apparatus 40 controls the flappers 64*a* and 64*b* on the basis of the print job and the image inspection result. The control apparatus 40 may also control the flappers 64*a* and 64*b* to output the sheet P to the post-processing apparatus 70.

The post-processing apparatus 70 conveys the sheet P via a plurality of conveyance rollers 73. The post-processing apparatus 70 includes discharge trays including a top tray 74*a*, a middle tray 74*b*, and a bottom tray 74*c*. The control apparatus 40 controls flappers 72*a* and 72*b* and discharges the sheet P to either the top tray 74*a*, the middle tray 74*b*, or the bottom tray 74*c*. Note that the post-processing apparatus 70 may be provided with a binding device that forms the sheets P discharged from the loading apparatus 60 into a bundle of sheets and binds the bundle of sheets using a staple. The post-processing apparatus 70 may be provided with a bookbinding device that folds a bundle of sheets in two. The post-processing apparatus 70 may also be provided with a cutting device that cuts the bundle of sheets.

In the present embodiment, the sheets P determined to have passed by the image inspection apparatus 50 are loaded into the large capacity tray 61, bundled by the post-processing apparatus 70, and the like. In the related art, if a single sheet P in a bundle of hundreds of sheets P is determined as a fail, the entire bundle of sheets is discarded. However, in the present embodiment, the failed sheet P is removed from the bundle of sheets, and printing is performed again on another sheet P, thus not wasting the bundle of sheets. In other words, the present embodiment contributes to the effective use of resources.

Control Apparatus

Figure 2:
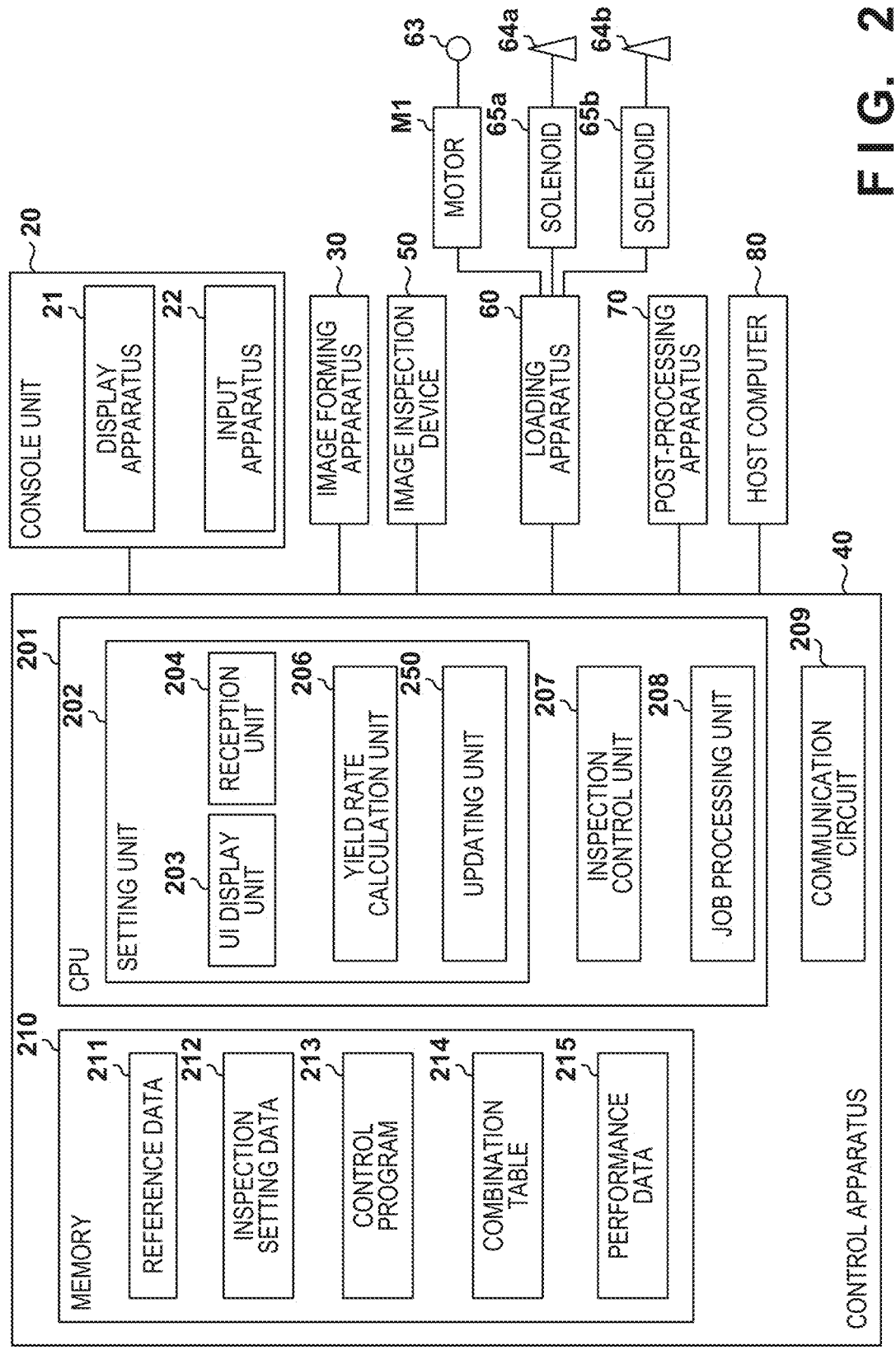
FIG. 2 is a diagram for describing a control apparatus.

FIG. 2 is a diagram illustrating the control apparatus 40 in detail. A CPU 201 implements a plurality of functions by executing a control program 213 stored in a memory 210. The CPU 201 may be provided with a plurality of processors or a CPU core. One or more or all of the functions implemented by the CPU 201 may be implemented using a hardware circuit other than the CPU 201. The memory 210 is a storage apparatus including a read-only memory (ROM), random-access memory (RAM), a solid state drive (SSD), a hard disk drive (HDD), and the like.

A UI display unit 203 of a setting unit 202 displays the user interface (UI) necessary for setting the settings of the image inspection on a display apparatus 21 of the console unit 20. A reception unit 204 of the setting unit 202 receives operations and instructions with respect to the user interface from an input apparatus 22. The reception unit 204, for example, receives sheet information, an inspection matter (misaligned detection, black dot detection, and the like), inspection level, and reduction level. An inspection matter may also be referred to as an inspection item. The sheet information indicates the type of the sheet P. The inspection level indicates how strict the image inspection is. The reduction level indicates the intensity (degree of effect) of the reduction process to reduce the shadows produced by the recesses and protrusions on the embossed paper from the read result of the sheet P, for example. The setting unit 202 stores inspection settings data 212 in the memory 210. Inspection settings data 212 is information relating to image inspection, such as sheet information, the inspection matter, inspection level, reduction level, and the like, set by the user via the display apparatus 21.

In the image inspection, reference data 211 is used as a pass criterion. An inspection control unit 207 transmits the reference data 211 together with the inspection settings data 212 to the image inspection apparatus 50. Note that the reference data 211, for example, may be document image data (RIP image data) associated with a print job received by a communication circuit 209 from a host computer 80. RIP is an acronym for raster image processing. The reference data 211, for example, may be image data obtained by reading one or a plurality of sheets on which an image corresponding to a reference image is formed.

A yield rate calculation unit 206 calculates the yield rate based on the inspection result received from the image inspection apparatus 50, generates performance data 215 including the yield rate and stores it in the memory 210 together with the sheet information, the inspection matter, the inspection level, and the reduction level. An updating unit 250 updates a combination table 214 in accordance with the yield rate.

The inspection control unit 207 transfers the inspection settings data 212 to the image inspection apparatus 50 and transmits a command to execute image inspection to the image inspection apparatus 50. A job processing unit 208 controls print jobs for printing an image of the sheet P, load jobs for loading a bundle of sheets in the loading apparatus 60, post-processing jobs executed by the post-processing apparatus 70 on a bundle of sheets, and the like. Thus, the job processing unit 208 prints an image on the sheet P and receives inspection jobs for inspecting the quality of the printed image.

The loading apparatus 60 drives a motor M1 in accordance with a control command from the job processing unit 208 to rotate the conveyance roller 63. The loading apparatus 60 drives solenoids 65a and 65b in accordance with a control command from the job processing unit 208 to switch between the flappers 64a and 64b. In this manner, the sheet P is guided and conveyed to either the defect tray 62, the large capacity tray 61, or the post-processing apparatus 70. For example, in a case when the image inspection result from the image inspection apparatus 50 is a defect (fail), the job processing unit 208 controls the loading apparatus 60 and discharges the sheet P determined to be a defect to the defect tray 62. The image forming apparatus 30 and the post-processing apparatus 70 also each includes a solenoid for driving a flapper and a motor for driving a conveyance roller.

Inspection Controller

Figure 3:
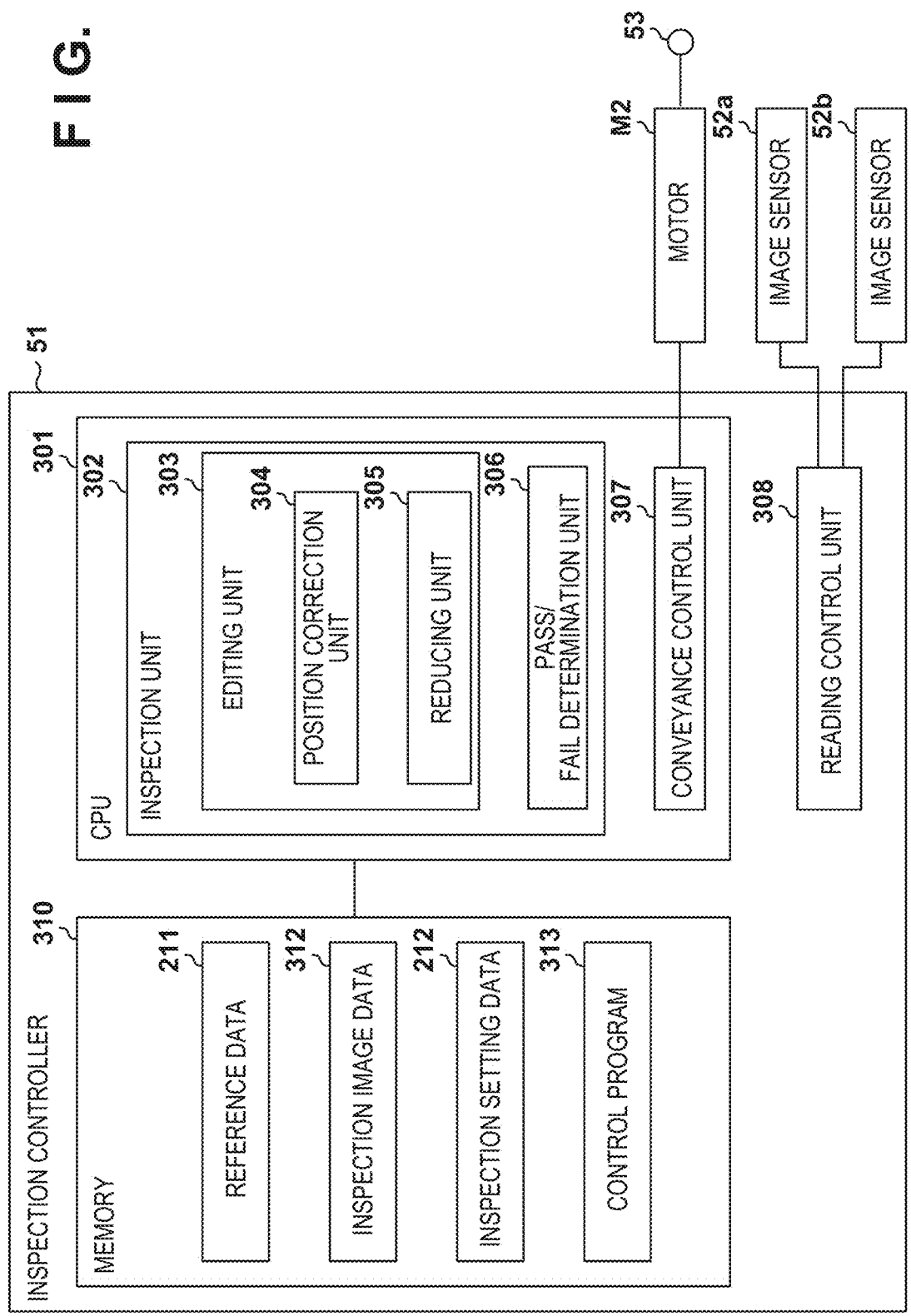
FIG. 3 is a diagram for describing an inspection controller.

FIG. 3 is a diagram illustrating the inspection controller 51 in detail. A CPU 301 implements a plurality of functions by executing a control program 313 stored in a memory 310. One or more or all of the functions may be implemented using a hardware circuit. The memory 310 is a storage apparatus including a ROM, a RAM, an SSD, an HDD, and the like.

An inspection unit 302 executes image inspection in accordance with the inspection settings data 212 received from the control apparatus 40 and transmits the inspection result to the control apparatus 40.

A conveyance control unit 307 drives a motor M2 to rotate the conveyance roller 53. A reading control unit 308 controls the image sensors 52a and 52b, reads the sheet P, and generates image data. The image sensor 52a reads a first surface of the sheet P and the image sensor 52b reads a second surface of the sheet P. In this manner, the present embodiment can execute image inspection on both surfaces of the sheet P.

An editing unit 303 edits the image data generated by the reading control unit 308, generates inspection image data 312, and stores the data in the memory 310. A position correction unit 304 performs position correction on the reading result from the image sensors 52a and 52b. When the sheet P is read by the image sensors 52a and 52b with the sheet P skewed, in the read image, the sheet P may be skewed. Also, in the read image, the leading end of the sheet P may be off from the ideal position. Here, the position correction unit 304 rotates the reading result, offsets the coordinates of the pixels, and corrects the position of the sheet P in the reading result. A reducing unit 305 reduces the shadows produced by the recesses and protrusions of the embossed paper from the post-position correction reading result, for example. For example, the reducing unit 305 executes a reduction process in accordance with the reduction level specified by the inspection settings data 212 on the post-position correction inspection image data 312. The reduction process will be described below.

A pass/fail determination unit 306 determines the quality of the image formed on the sheet P on the basis of the reference data 211 and the inspection image data 312 in accordance with the inspection settings data 212. For example, the inspection matter may be set to "misalignment detection". The pass/fail determination unit 306 may make a determination of pass in a case when the misalignment amount between the position of the image of the reference data 211 and the position of the image of the inspection image data 312 is equal to or less than a determination threshold. The pass/fail determination unit 306 may make a determination of fail in a case when the misalignment amount is greater than the determination threshold. In other words, the pass/fail determination unit 306 executes determination processing to determine the misalignment, corresponding to the degree of match, between an image corresponding to the reference data 211 and an image corresponding to the inspection image data 312 on which the reduction process (image editing process) has been performed. Also, the inspection matter may be set to "black dot detection". The pass/fail determination unit 306 may make a determination of pass in a case where there are no black dots in the image of the reference data 211 and the size of the black dot in the image of the inspection image data 312 is equal to or less than a determination threshold. In other words, black dots correspond to a noise image not in the image corresponding to the reference data 211 but in an image corresponding to the inspection image data 312 on which the reduction process has been performed. The pass/fail determination unit 306 may make a determination of fail in a case where the size of the black dot is greater than the determination threshold. In other words, the pass/fail determination unit 306 executes determination processing to determine the black dot, corresponding to the degree of match, between an image corresponding to the reference data 211 and an image corresponding to the inspection image data 312 on which the reduction process (image editing process) has been performed. In a case when the inspection level is high (strict), the determination threshold is low. In a case when the inspection level is low (loose), the determination threshold is high. The pass/fail determination unit 306 transmits the inspection result and the inspection image data 312 to the control apparatus 40. Note that in the present embodiment, misalignment detection and black dot detection are used as inspection matters, but these are simply examples. For example, other examples of an inspection matter may include streak detection and the like. Streak detection refers to detecting streak-like images not present in the document image. In other words, streaks correspond to a noise image not in the image corresponding to the reference data 211 but in an image corresponding to the inspection image data 312 on which the reduction process has been performed. A streak may be produced when a member involved in image formation needs to be cleaned, replaced, or repaired. In other words, determination processing may be performed to determine streaking, corresponding to the degree of match, between an image corresponding to the reference data 211 and an image corresponding to the inspection image data 312 on which the reduction process (image editing process) has been performed. In the present embodiment, in a case when the inspection matter is misalignment detection, an inspection of the relative positions between an image of the reference data 211 and an image of the inspection image data 312 is performed. However, this is merely an example. For example, the absolute position relative to an edge of the sheet of an image of the inspection image data 312 may be inspected. In this case, a determination of pass is made in a case when the distance between the absolute position of the image of the reference data 211 and the absolute position of the image of the inspection image data 312 is equal to or less than a determination threshold. A determination of fail is made in a case when the distance is greater than the determination threshold.

Inspection Settings UI

Figure 4A:
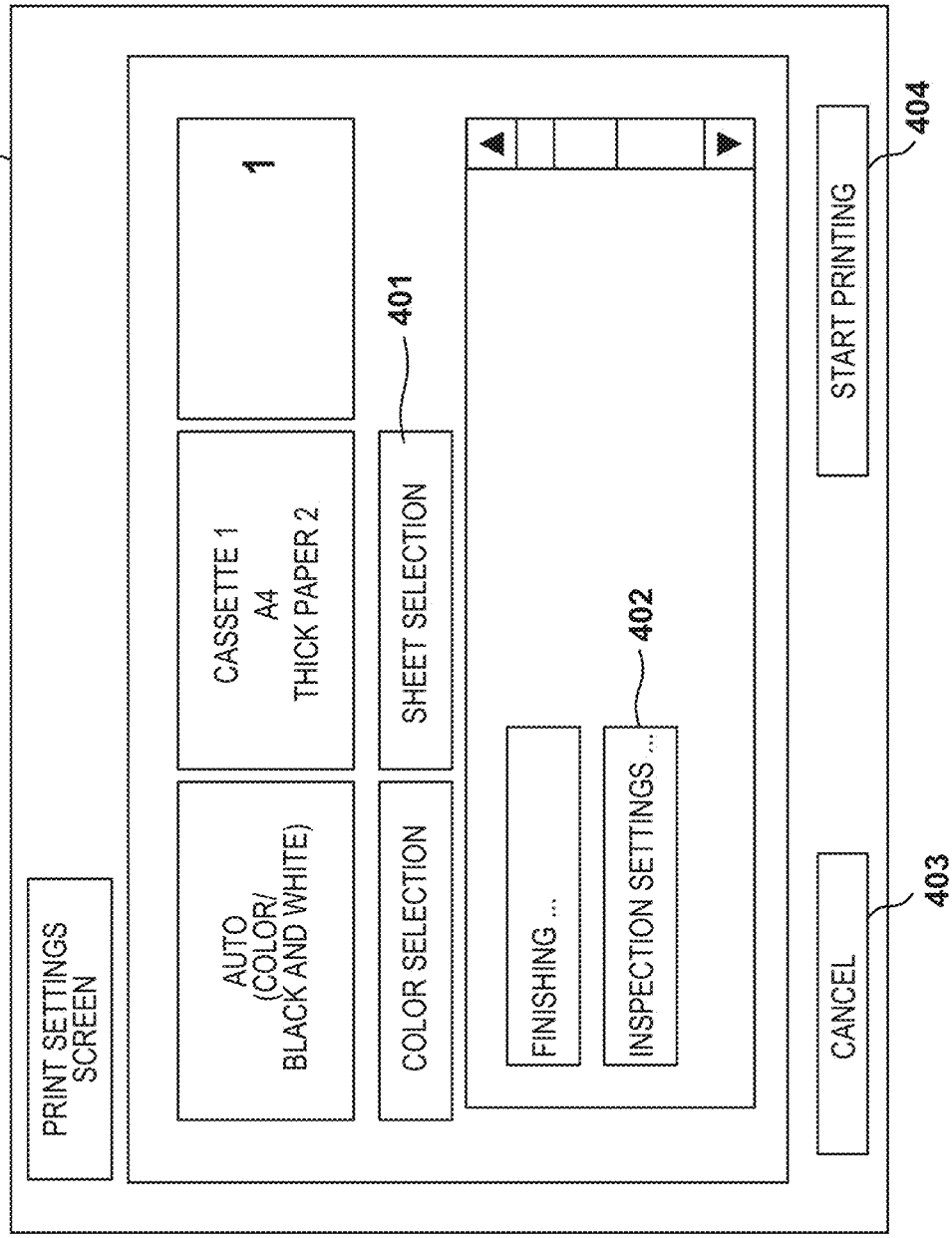

FIG. 4A is a diagram illustrating an example of a print settings screen 400. FIG. 4B is a diagram illustrating an example of an inspection settings UI 410. The CPU 201 (UI display unit 203) displays the print settings screen 400 on the display apparatus 21 in accordance with the control program 213. The print settings screen 400 includes a sheet selection button 401. When the sheet selection button 401 is pressed, the CPU 201 (reception unit 204) receives the specification of the sheet cassette from which to fed the sheet P, the size of the sheet P, the type of the sheet P (for example, thick paper, plain paper, thin paper, gloss paper, embossed paper), and the like. When an inspection settings button 402 is pressed, the CPU 201 (UI display unit 203) displays the inspection settings UI 410 illustrated in FIG. 4B on the display apparatus 21. When a cancel button 403 is pressed, the CPU 201 (setting unit 202) discards the settings matter set by the user on the print settings screen 400 and returns to the initial settings screen (not illustrated). When a print start button 404 is pressed, the CPU 201 (job processing unit 208) starts printing without performing image inspection.

As illustrated in FIG. 4B, the inspection settings UI 410 includes an image display region 411 and a detailed settings region 412. The image display region 411 is a region where a reference image such as the reference data 211 or a reference image for which a process at the set reduction level has been performed is displayed or a region where inspection region settings for the reference image are received.

The detailed settings region 412 is a region where one or more inspection settings are displayed and inspection settings are received. A sheet menu 413a displays candidates for the type of the sheet P (for example, thick paper, plain paper, thin paper, gloss paper, and embossed paper) and receives the specification of the type of the sheet P from the user. The sheet menu 413a may be implemented via a control object, such as a button, checkbox, or the like, that allows for the type of the sheet P to be specified. The CPU 201 (reception unit 204) stores the type of the sheet P selected by the user from the sheet menu 413a in the inspection settings data 212.

A reduction level menu 414a is a control object that can be interacted with when embossed paper is specified from the sheet menu 413a. The reduction level menu 414a displays a plurality of candidates for the reduction level and receives one specification for the reduction level therefrom. The type of the sheet P specified from the sheet menu 413a may be a type (for example, thick paper, plain paper, and thin paper) on which the reduction process cannot be performed. In this case, the CPU 201 (reception unit 204) grays out the reduction level menu 414a so that it is unable or prohibited to be used by the user. When the reduction level is specified, the CPU 201 may display the reference image for which a process at the specified reduction level has been performed on the image display region 411. The details will be described below.

A settings region 415a includes a set area button 416a, a matter menu 417a, and an inspection level menu 418a. When embossed paper is specified from the sheet menu 413a and the reduction level is set in the reduction level menu 414a, the CPU 201 allows the user to interact with the settings region 415a. Also, when thick paper, plain paper, thin paper, or gloss paper is specified from the sheet menu 413a, the CPU 201 executes control to allow the user to interact with the settings region 415a.

The following description focuses on an example in which embossed paper is specified from the sheet menu 413a.

The set area button 416a displays the names of the inspection areas. There is an indicator that an inspection area 421a is displayed via a dashed line to the left of the set area button 416a. When the set area button 416a is pressed, the CPU 201 (reception unit 204) receives the specification of the inspection area 421a input by a user in the image display region 411. For example, the CPU 201 (reception unit 204) sets the region of the image display region 411 touched with a finger or a touchpen as the inspection area. For example, the CPU 201 (reception unit 204) sets the coordinates with the upper left corner of the reference image set as the origin point and stores the coordinates of the inspection area 421a specified by the user in the inspection settings data 212. The CPU 201 (UI display unit 203) may display the inspection area set by the user in a highlighted manner. Displaying in a highlighted manner includes surrounding the inspection area with a frame, displaying stripes in the inspection area, and the like.

The matter menu 417a displays the inspection matter candidates and receives the specification of the inspection matter by the user. The CPU 201 (the reception unit 204) stores the inspection matter selected from the matter menu 417a in the inspection settings data 212.

When the inspection matter is specified from the matter menu 417a, the CPU 201 allows the user to interact with the inspection level menu 418a. The inspection level menu 418a displays the inspection level candidates and receives the specification of the inspection level by the user. The CPU 201 (the reception unit 204) stores the inspection level selected from the inspection level menu 418a in the inspection settings data 212.

When an add button 419a is pressed, the CPU 201 (UI display unit 203 and the reception unit 204) additionally displays a second matter menu and receives the specification of an additional inspection matter.

A settings region 415b receives the inspection settings in a similar manner to the settings region 415a. The settings region 415b includes a set area button 416b that receives a second inspection area 421b, a matter menu 417b, and an inspection level menu 418b. There is an indicator that the set area button 416b is displayed via a dot-dash line to the left of the second inspection area 421b. The second inspection area 421b is displayed via a dot-dash line in the image display region 411.

An add button 420 is a button for adding a settings region 415. For example, in the default state, only the settings region 415a is displayed. When the add button 420 is pressed in this state, the CPU 201 (UI display unit 203) additionally displays the settings region 415b.

When a return button 422 is pressed, the CPU 201 (UI display unit 203) returns to the print settings screen 400. When an inspection print start button 423 is pressed, the CPU 201 (inspection control unit 207) starts a print job in accordance with an image inspection.

Note that the layout of the selection items of the inspection settings UI 410 in FIG. 4B is merely an example according to the present embodiment. In other words, the present invention is not limited to this.

Reduction Process

FIGS. 5A to 5D are diagrams illustrating examples of images on which a process at the reduction level has been performed. In the present embodiment, because the embossed paper is read by the image sensor 52a, the protrusions and recesses on the surface of the sheet P produce shadows in the reading result. The shadows produce a design-like image.

Figure 5A:
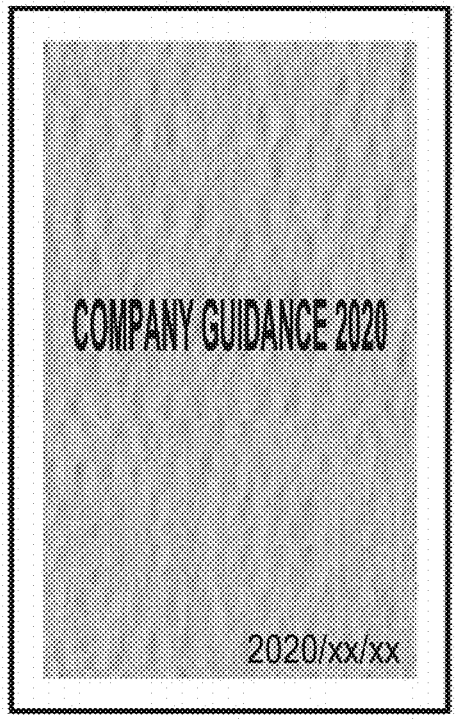
FIGS. 5A to 5D are diagrams for describing the intensity (effect) of a reduction process.

FIG. 5A is a diagram illustrating the reading result in a case when the reduction process is not applied. The shape and positions of the protrusions and recesses on the surface of the sheet P may be different for each sheet P. Thus, when an inspection is performed using the image illustrated in FIG. 5A as a reference image, a difference in the recesses and protrusions on the embossed paper corresponding to the reference image and the embossed paper on which an image, the inspection target, is formed may cause a determination of a defect. In other words, even if the image formed on the sheet P is not a defect, the recesses and protrusions may cause a determination of a defect.

Here, the reducing unit 305 changes any density equal to or less than the specified density to a predetermined value (for example, zero). For example, in a case when the density (tone) of an image is expressed using 8 bits (from 0 to 255), a density equal to or less than the threshold is reduced and a density greater than the threshold is kept the same. In this manner, shadows produced by the recesses and protrusions of the sheet P from the image, i.e., the reading result, are reduced. For example, in a case when the density of an image is expressed using 255 levels, when the reduction level is 1, a density from 0 to the 16th level is reduced. When the reduction level is 2, a density up to the $32^{nd}$ level is reduced. When the reduction level is 3, a density up to the 48th level is reduced.

Figure 5B:
Figure 5C:
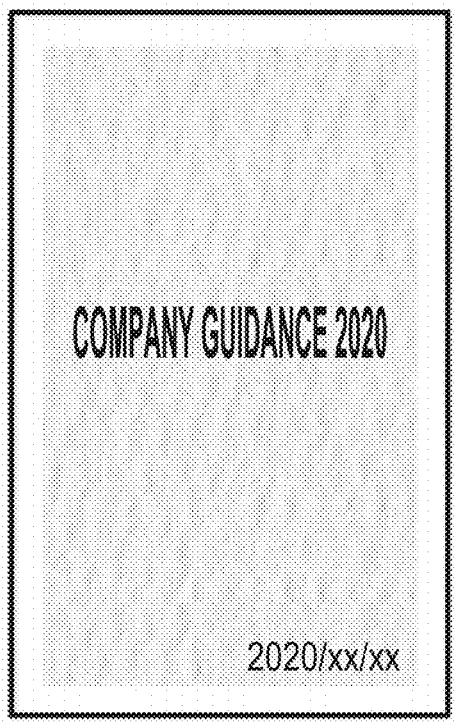
Figure 5D:
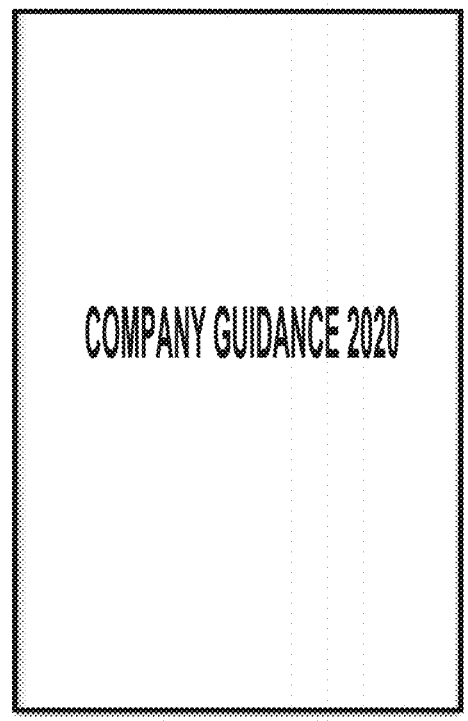

FIG. 5B is a diagram illustrating the reading result in a case when the reduction process is applied at a reduction level of 1. FIG. 5C is a diagram illustrating the reading result in a case when the reduction process is applied at a reduction level of 2. FIG. 5D is a diagram illustrating the reading result in a case when the reduction process is applied at a reduction level of 3. A higher reduction level means more shadows are reduced. When the reduction level is 3, the reading result is that of an almost completely white paper. Note that in the present embodiment, the reduction process is a process performed to change a pixel density equal to or less than a threshold corresponding to the reduction level to a predetermined value (for example, zero). However, this is merely an example. For example, a reduction process may be employed that lightens, by a predetermined ratio, a pixel density equal to or less than the threshold corresponding to the reduction level. Also, a known whitening process may be employed on pixels with a density equal to or less than the threshold corresponding to the reduction level.

Setting the Reduction Level

In a case when the type of the sheet P is embossed paper, by the user setting the reduction level to a high reduction level, shadows are removed from the reading result of the sheet P. This helps prevent erroneous determinations caused by recesses and protrusions. On the other hand, when the reduction level is set to a high reduction level, a printed image may also be removed. Specifically, for example, as illustrated in FIG. 5D, the half-tone image characters "2020/XX/XX" are removed by the reduction process. In a case when "2020/XX/XX" is selected as the inspection target, this means that "2020/XX/XX" cannot be appropriately inspected.

Thus, in the present embodiment, when the user selects a reduction level from the reduction level menu 414a, the CPU 201 displays an image for which the process at the selected reduction level has been performed in the image display region 411 of the inspection settings UI 410. Specifically, in a case when 1 is selected for the reduction level, the image of FIG. 5B is displayed in the image display region 411 of the inspection settings UI 410. Also, in a case when 2 is selected for the reduction level, the image of FIG. 5C is displayed in the image display region 411 of the inspection settings UI 410. Also, in a case when 3 is selected for the reduction level, the image of FIG. 5D is displayed in the image display region 411 of the inspection settings UI 410.

This allows the user to set the reduction level while looking at the image displayed in the image display region 411. In other words, the user can set the reduction level while checking that the image (for example, "2020/XX/XX") that is the inspection target is not removed by the reduction process. This can help prevent the image that is the inspection target from being unable to be appropriately inspected.

Combining the Reduction Level and Inspection Level

In a case when the inspection level is high and the reduction level is low, the likelihood of shadows causing an erroneous determination is increased. In other words, even if the image formed on the sheet P is not a defect, the likelihood that the recesses and protrusions cause a determination of a defect is increased.

FIGS. 6A and 6B are diagrams for describing the concept of the combination table 214 in which combinations of the reduction level and the inspection level are listed. As illustrated in FIG. 6A, for example, in a case when the inspection matter is black dot detection, a combination of a reduction level of 2 and an inspection level of 1 is a combination that is relatively unlikely to produce a defect caused by shadows (OK). Also, for example, in a case when the inspection matter is black dot detection, a combination of a reduction level of 2 and an inspection level of 2 is a combination that is relatively likely to produce a defect caused by shadows (defect). For example, in a case when the inspection matter is misalignment detection, a combination of a reduction level of 2 and an inspection level of 2 is a combination that is relatively unlikely to produce a defect caused by shadows (OK). For example, in a case when the inspection matter is misalignment detection, a combination of a reduction level of 2 and an inspection level of 3 is a combination that is relatively likely to produce a defect caused by shadows (defect). In this manner, in the present embodiment, for each inspection matter, a table is stored that shows whether or not each combination of reduction levels and inspection levels tends to produce a defect. Note that the tables in FIGS. 6A and 6B are merely examples according to the present embodiment, and the present invention is not limited thereto.

FIGS. 7A and 7B are diagrams illustrating the inspection settings UI 410 when black dot detection is selected as the inspection matter. FIG. 7A is a diagram illustrating the inspection settings UI 410 in a case when black dot detection is selected as the inspection matter and a reduction level of 3 is set. FIG. 7B is a diagram illustrating the inspection settings UI 410 in a case when black dot detection is selected as the inspection matter and a reduction level of 2 is set.

As illustrated in FIG. 7A, in a case when black dot detection is selected as the inspection matter and a reduction level of 3 is set, when the inspection level menu 418a is pressed, a pull-down list is displayed. As listed in the table of FIG. 6A, in a case when black dot detection is selected as the inspection matter and a reduction level of 3 is set, the inspection levels of 1, 2, and 3 all result in "OK". Thus, the user can select 1, 2, or 3 as the inspection level. On the other hand, as listed in the table of FIG. 6A, in a case when black dot detection is selected as the inspection matter and a reduction level of 2 is set, the inspection level of 1 results in "OK", but the inspection levels of 2 and 3 result in "defect". According to the present embodiment, the CPU 201 prohibits the user from selecting the options resulting in "defect". In other words, as illustrated in FIG. 7B, in a case when black dot detection is selected as the inspection matter and a reduction level of 2 is set, the CPU 201 grays out the inspection levels 2 and 3. This prevents the user from selecting the inspection levels 2 and 3. Thus, the user can only select 1 as the inspection level. In this manner, in the present embodiment, in a case when black dot detection is the inspection matter, determination processing where the reduction level corresponding to the intensity of the image editing process is a first intensity (for example, 1) and the inspection level corresponding to the determination threshold is a second value (for example, 2 or 3) is not executed. Also, in a case when black dot detection is the inspection matter, determination processing where the reduction level corresponding to the intensity of the image editing process is a first intensity (for example, 1) and the inspection level corresponding to the determination threshold is a first value (for example, 1) is executed. Also, in a case where black dot detection is the inspection matter, determination processing where the reduction level corresponding to the intensity of the image editing process is a second intensity (for example, 2) and the inspection level corresponding to the determination threshold is a second value (for example, 2 or 3) is not executed. Also, in a case where black dot detection is the inspection matter, determination processing where the reduction level corresponding to the intensity of the image editing process is a second intensity (for example, 2) and the inspection level corresponding to the determination threshold is a first value (for example, 1) is executed.

Figure 8A:
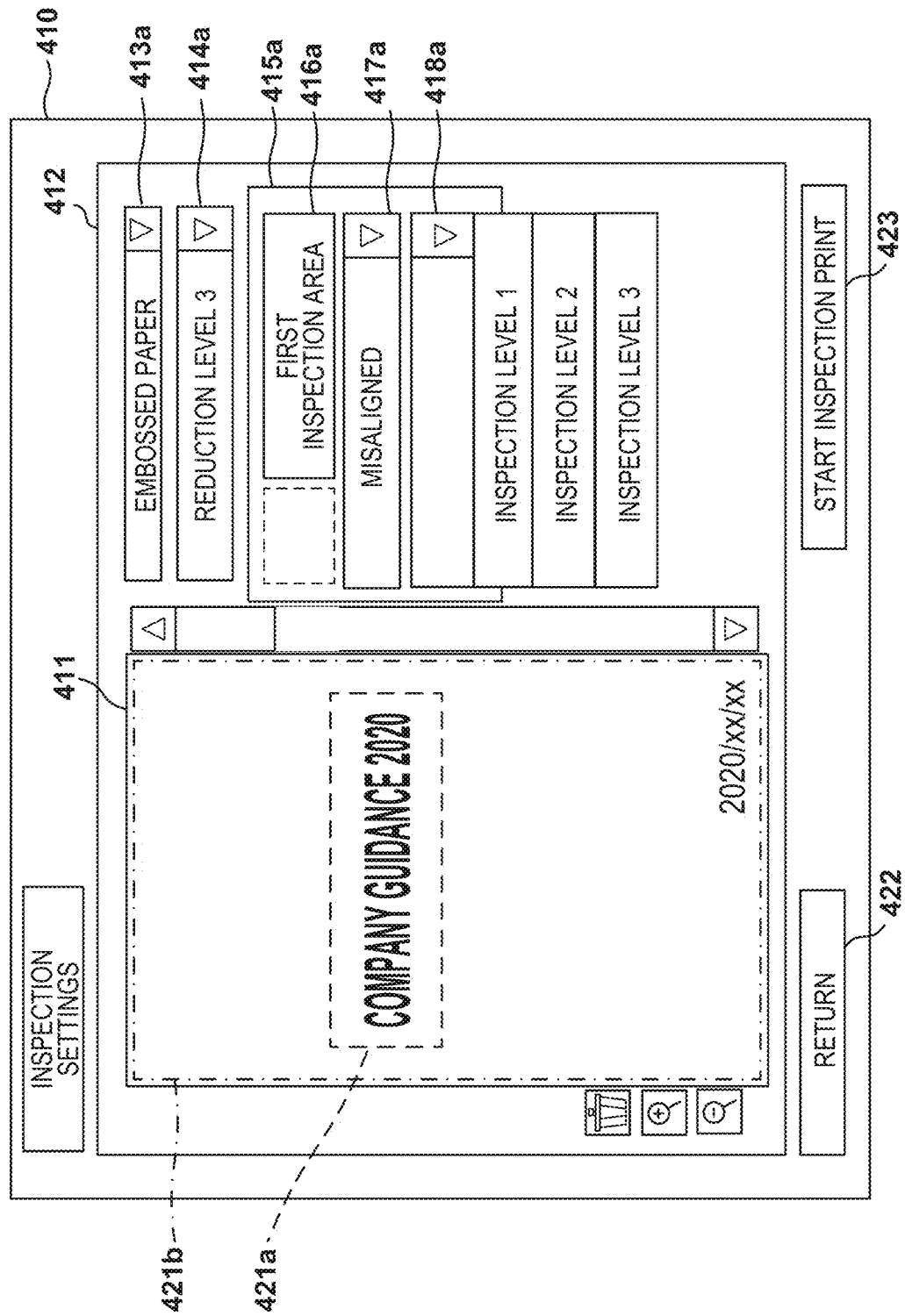
FIGS. 8A and 8B are diagrams for describing inspection settings.
Figure 8B:
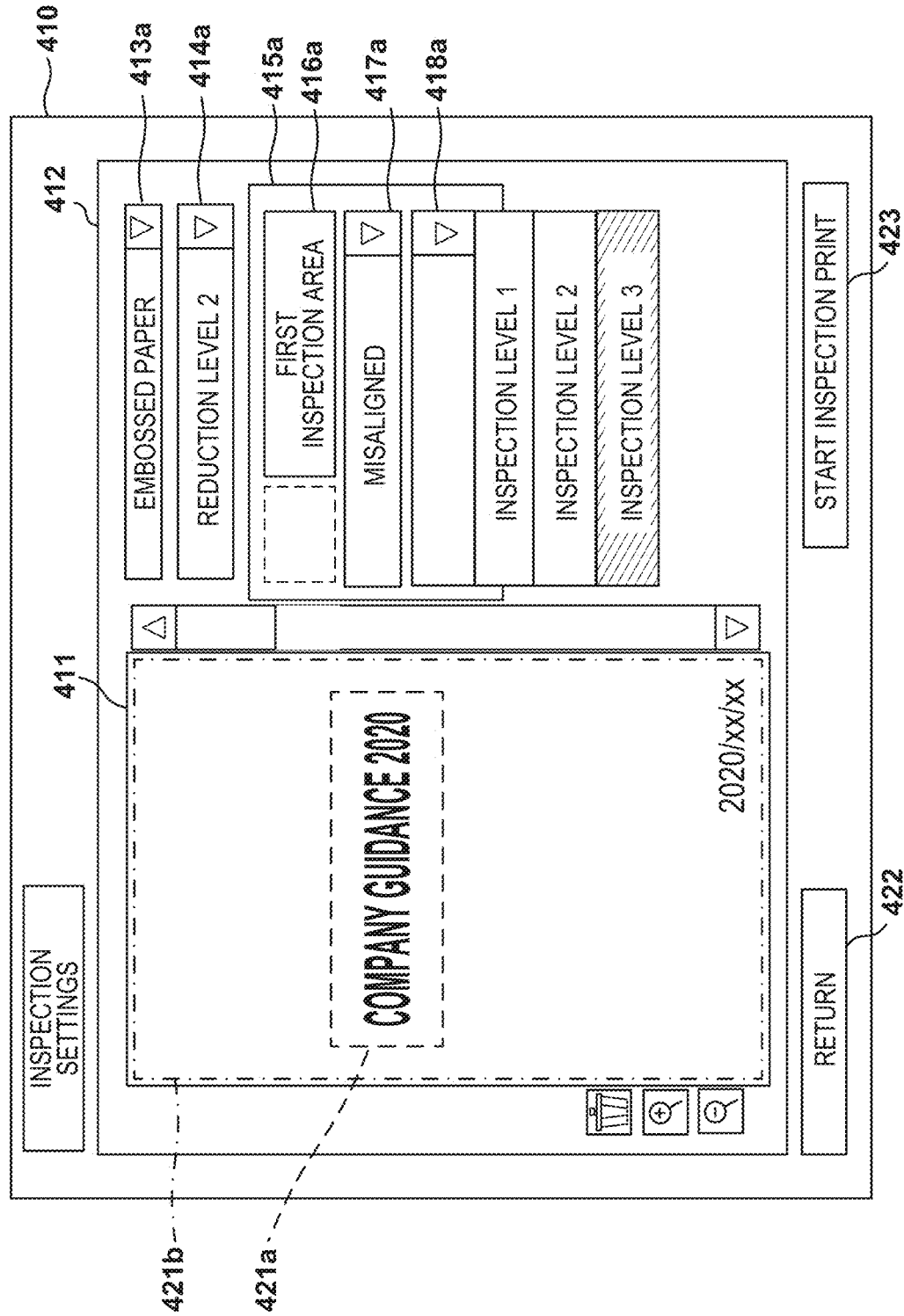

FIGS. 8A and 8B are diagrams illustrating the inspection settings UI 410 when misalignment detection is selected as the inspection matter. FIG. 8A is a diagram illustrating the inspection settings UI 410 in a case when misalignment detection is selected as the inspection matter and a reduction level of 3 is set. FIG. 8B is a diagram illustrating the inspection settings UI 410 in a case when misalignment detection is selected as the inspection matter and a reduction level of 2 is set.

As illustrated in FIG. 8A, in a case when misalignment detection is selected as the inspection matter and a reduction level of 3 is set, when the inspection level menu 418a is pressed, the CPU 201 displays a pull-down list. As listed in the table of FIG. 6B, in a case when misalignment detection is selected as the inspection matter and a reduction level of 3 is set, the inspection levels of 1, 2, and 3 all result in "OK". Thus, the user can select 1, 2, or 3 as the inspection level. On the other hand, as listed in the table of FIG. 6B, in a case when misalignment detection is selected as the inspection matter and a reduction level of 2 is set, the inspection levels of 1 and 2 result in "OK". However, the inspection level of 3 results in "defect". In the present embodiment, the CPU 201 prohibits the user from selecting the options resulting in "defect". In other words, as illustrated in FIG. 8B, in a case where misalignment detection is selected as the inspection matter and a reduction level of 2 is set, the CPU 201 grays out the inspection level 3. This prevents the user from selecting the inspection level 3. Thus, the user can select 1 or 2 as the inspection level. In this manner, in the present embodiment, in a case when misalignment detection is the inspection matter, determination processing where the reduction level corresponding to the intensity of the image editing process is a first intensity (for example, 1) and the inspection level corresponding to the determination threshold is a second value (for example, 3) is not executed. Also, in a case when misalignment detection is the inspection matter, determination processing where the reduction level corresponding to the intensity of the image editing process is a first intensity (for example, 1) and the inspection level corresponding to the determination threshold is a first value (for example, 1) is executed. Also, in a case when misalignment detection is the inspection matter, determination processing where the reduction level corresponding to the intensity of the image editing process is a second intensity (for example, 2) and the inspection level corresponding to the determination threshold is a second value (for example, 3) is not executed. Also, in a case when misalignment detection is the inspection matter, determination processing where the reduction level corresponding to the intensity of the image editing process is a second intensity (for example, 2) and the inspection level corresponding to the determination threshold is a first value (for example, 1) is executed.

Flowchart

Figure 9:
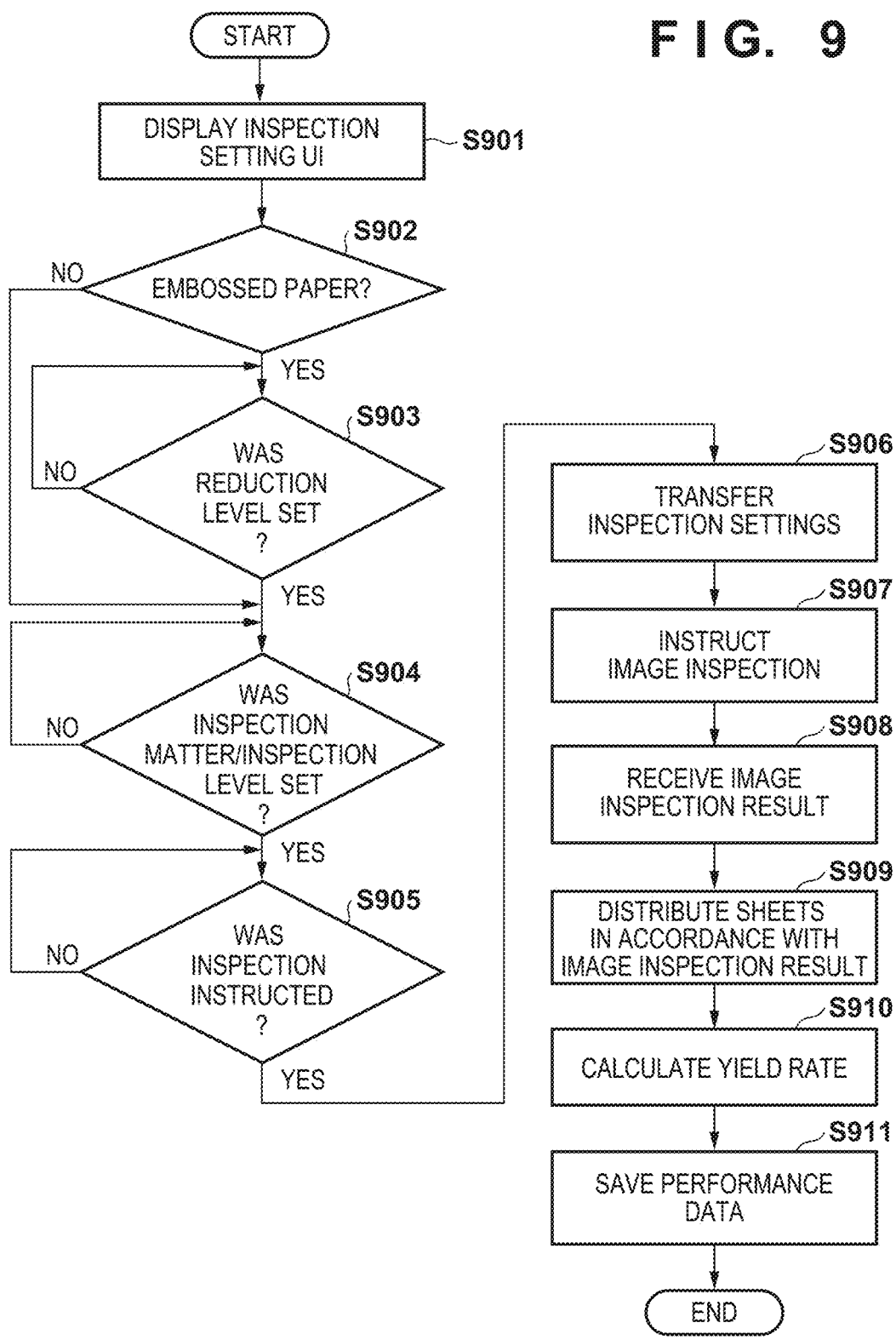
FIG. 9 is a flowchart for describing an image inspection method.

FIG. 9 is a diagram illustrating an image inspection method executed by the CPU 201 of the control apparatus 40. The flowchart process starts when the inspection settings button 402 is pressed.

In step S901, the CPU 201 displays the inspection settings UI 410 on the UI display unit 203.

In step S902, the CPU 201 determines whether or not embossed paper is set as the type of the sheet P. In a case when the type of the sheet P is embossed paper, the CPU 201 advances the process to step S903. On the other hand, in a case when a type other than embossed paper is set as the type of the sheet P, the settings region 415a is made able to be interacted with before the CPU 201 advances the process to step S904.

In step S903, the CPU 201 determines whether or not the reduction level has been set. When the reduction level is set, the CPU 201 makes the settings region 415a able to be interacted with before advancing the process to step S904. Also, the reduction level is stored in the inspection settings data 212. Note that when the inspection matter is set, the CPU 201 executes gray-out processing on the basis of the already set reduction level and the inspection matter. The gray-out processing is as described in relation to FIGS. 7B and 8B. Also, the reduction level is stored in the inspection settings data 212.

In step S904, the CPU 201 determines whether or not the inspection matter and the inspection level has been set. When the inspection matter and the inspection level are set, the CPU 201 advances the process to step S905. Also, the inspection matter and the inspection level are stored in the inspection settings data 212.

In step S905, the CPU 201 determines whether or not there has been an instruction by a user to start an inspection job. When there is an instruction to start an inspection job, the CPU 201 advances the process to step S906. In step S906, the CPU 201 transfers the inspection settings data 212 to the image inspection apparatus 50.

Then, in step S907, the CPU 201 controls the image forming apparatus 30 in accordance with the document image data associated with the inspection job, forms an image on the sheet P, and instructs the image inspection apparatus 50 to perform image inspection.

In step S908, the CPU 201 (inspection control unit 207) receives the image inspection result from the CPU 301 of the inspection controller 51. In step S909, the CPU 201 distributes the sheet P in accordance with the image inspection result. For example, in a case when the inspection result is a fail, the job processing unit 208 controls the motor M1 and solenoids 65a and 65b of the loading apparatus 60 and discharges the sheet P determined to be a defect to the defect tray 62. Note that in a case when the inspection result is a fail (defect), the control apparatus 40 may control the image forming apparatus 30 so that the cause of the fail is resolved. In a case when, for example, the cause of the fail is misalignment, the control apparatus 40 may control the image forming apparatus 30 to bring the formed image into closer alignment with the reference image. For example, in a case when the inspection result is a pass, the job processing unit 208 controls the motor M1 and solenoids 65a and 65b of the loading apparatus 60 and discharges the sheet P determined to be a pass to the large capacity tray 61 or the post-processing apparatus 70.

In step S910, the CPU 201 (yield rate calculation unit 206) calculates the yield rate. A yield rate X may be calculated on the basis of a total number N of the sheets P inspected via an inspection job and a number M of the sheets P determined to be a defect (X=M/N). The yield rate X may be expressed as a percentage.

In step S911, the CPU 201 (the yield rate calculation unit 206) generates the performance data 215 including the yield rate X and stores it in the memory 210. Note that the CPU 201 may include the reading result (image data) of the sheets P determined to be a fail in the performance data 215. In this manner, the user can display the image data on the display apparatus 21 and verify the image inspection result.

Figure 10:
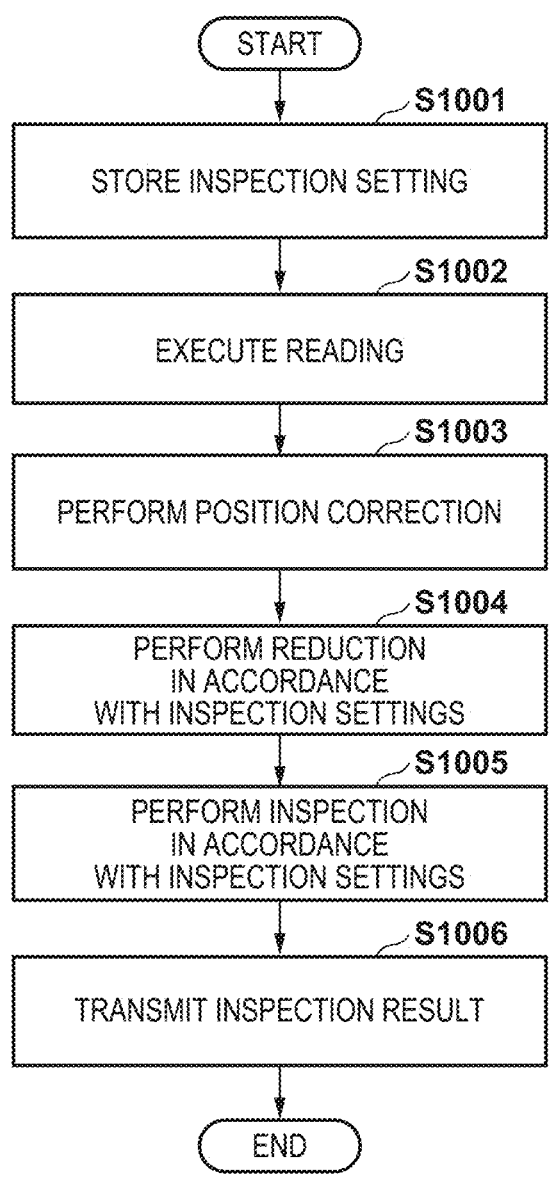
FIG. 10 is a flowchart for describing an image inspection method.

FIG. 10 is a diagram illustrating the image inspection method executed by the CPU 301 of the image inspection apparatus 50. When the CPU 301 receives an instruction or command to execute inspection from the control apparatus 40, the CPU 301 starts the following process.

In step S1001, the CPU 301 (inspection unit 302) receives the inspection settings (inspection settings data 212) from the control apparatus 40 and stores the inspection settings in the memory 310.

In step S1002, the CPU 301 (inspection unit 302) controls the image sensor 52a via the reading control unit 308 to execute reading of the sheet P. The reading control unit 308 stores the inspection image data 312, i.e., the reading result, in the memory 310.

In step S1003, the CPU 301 (position correction unit 304) executes position correction processing on the reading result (inspection image data 312). The position correction processing may be omitted.

In step S1004, the CPU 301 (reducing unit 305) performs the reduction process on the reading result (inspection image data 312) in accordance with the reduction level included in the inspection settings data 212. In a case where no reduction level is set, the reduction process is skipped.

In step S1005, the CPU 301 (inspection unit 302) performs an inspection in accordance with the inspection settings included in the inspection settings data 212. The inspection unit 302 performs an image inspection in accordance with the inspection level specified in the inspection settings data 212 for the inspection area specified in the inspection settings data 212.

In step S1006, the CPU 301 (inspection unit 302) transmits the inspection result to the CPU 201. The inspection unit 302 transmits the inspection image data 312 corresponding to a fail together with the inspection result to the CPU 201. In a case when printing and image inspection are to be performed continuously for a plurality of the sheets P, the CPU 301 repeats steps S1002 to S1006.

As described above, in the present embodiment, reduction process is performed in a case when embossed paper is selected as the type of the sheet that is the inspection target. Instances of recesses and protrusions causing a determination of a defect are reduced by the reduction process.

According to the present embodiment, the user can select the reduction level for the reduction process. When the reduction level is selected, the image for which the process at the selected reduction level has been performed is displayed in the image display region 411 of the inspection settings UI 410. This allows the user to set the reduction level while looking at the image displayed in the image display region 411. In other words, the user can set the reduction level while checking that the image (for example, "2020/XX/XX") that is the inspection target is not removed by the reduction process. This can help prevent the image that is the inspection target from being unable to be appropriately inspected.

In the present embodiment, the inspection levels that are selectable on the basis of the selected inspection matter and the reduction level are displayed. For example, non-selectable inspection levels may be grayed out. This helps prevent erroneous determinations caused by shadows. For example, this reduces the number of instances in which, even if the image formed on the sheet P is not a defect, the recesses and protrusions may cause a determination of a defect.

In this manner, according to the present embodiment, an image inspection is performed using a reduction level appropriate for the type of the sheet P and the inspection level. Thus, erroneous determinations can be reduced, and the product yield rate can be better than that of known techniques.

Note that, in the present embodiment, when embossed paper is selected as the type of the sheet P, the reduction level is made able to be selected. Furthermore, when the reduction level is selected, the inspection matter and the inspection level are made able to be selected. In other words, there is an order in which the items can be selected, but this order is merely an example. For example, the type of the sheet P, the reduction level, the inspection matter, and the inspection level may be selected in any order.

In the present embodiment, the inspection settings and the sheet P distribution are performed at the control apparatus 40, and the image inspection is performed at the image inspection apparatus 50. However, this is merely an example. The function of the control apparatus 40 may be incorporated into the controller of the image inspection apparatus 50 or the image forming apparatus 30.

In the present embodiment, embossed paper is used as an example of the type of the sheet P that affects image inspection. However, this is merely an example. Any type of sheet with a design on the surface may be used as the type of the sheet P to which the technical idea of the present embodiment can be applied. The present embodiment is applicable to any type that produces a design in the reading result.

Also, in the setting of the reduction level, the density is described using 255 levels and the reduction level is changed in increments of 16 levels. However, this is merely an example. The change amount of the threshold per one level may be less than 16 levels or greater than 16 levels.

There are many types of embossed paper circulating in the market. Thus, the depth of the protrusions and recesses on the embossed paper is also varied. Thus, the CPU 201 may receive the brand of the embossed paper via the input apparatus 22 and store the combination table 214 for each brand of embossed paper in the memory 210. In this manner, the CPU 201 may switch the combination table 214 in accordance with the brand specified by the user.

Second Embodiment

Descriptions of the configurations in the image inspection system 100 according to the second embodiment that are similar to that of the first embodiment will be omitted. In other words, the descriptions in the first embodiment are invoked for configurations that are the same or similar.

In the first embodiment, for example, the process at the reduction level set via the reduction level menu 414a is performed on the entire reference image. In the present embodiment, the reduction level can be individually set for each set inspection area.

Inspection Settings UI

Figure 11:
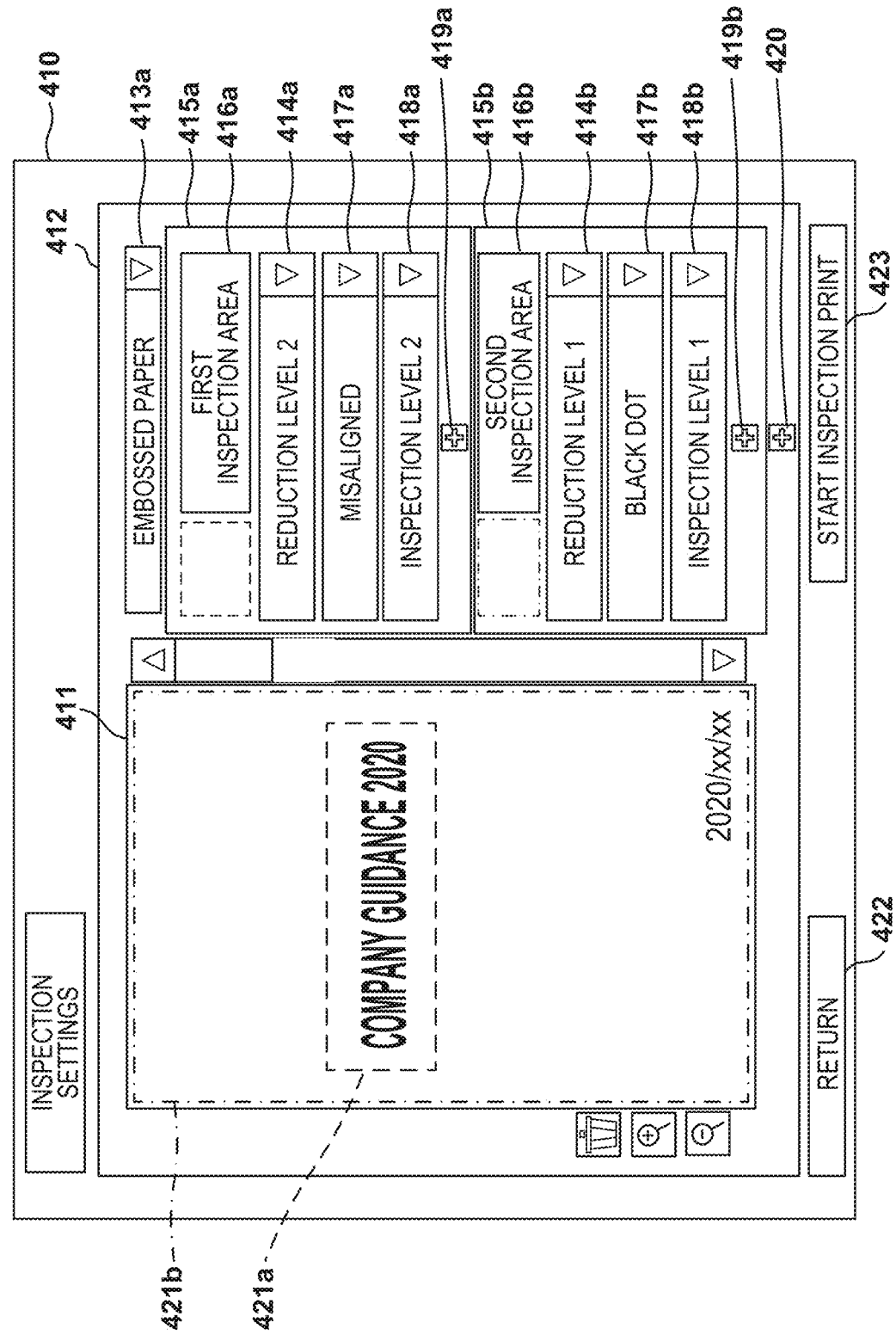
FIG. 11 is a diagram for describing inspection settings.

FIG. 11 illustrates an example of the inspection settings UI 410 according to the present embodiment. Note that, after here, descriptions of components with a similar function to that in the first embodiment will be omitted.

In the inspection settings UI 410 according to the present embodiment, the reduction level menu 414a corresponding to the first inspection area 421a is provided in the settings region 415a. Also, a reduction level menu 414b corresponding to the second inspection area 421b is provided in the settings region 415b.

The settings region 415a includes the set area button 416a, the matter menu 417a, and the inspection level menu 418a. The settings region 415a become interactive when the type of sheet is specified from the sheet menu 413a.

The following description focuses on an example in which embossed paper is specified from the sheet menu 413a.

When embossed paper is specified from the sheet menu 413a, the reduction level menu 414a and the reduction level menu 414b become able to be interacted with. Furthermore, the CPU 201 displays a plurality of candidates for the reduction level in the reduction level menu 414a and the reduction level menu 414b and receives one specification for the reduction level therefrom. The type of the sheet P specified from the sheet menu 413a may be a type (for example, thick paper, plain paper, and thin paper) on which the reduction process cannot be performed. In this case, the CPU 201 may gray out the reduction level menu 414a and the reduction level menu 414b, prohibiting the user from interacting with them.

The set area button 416a displays the names of the inspection areas. There is an indicator that an inspection area 421a is displayed via a dashed line to the left of the set area button 416a. The set area button 416b displays the names of the inspection areas. There is an indicator that the set area button 416b is displayed via a dot-dash line to the left of the inspection area 421b.

In the present embodiment, the area in which the reduction process of a reduction level set via the reduction level menu 414a is to be performed is the area displayed via a dashed line. Also, in the present embodiment, the area in which the reduction process of a reduction level set via the reduction level menu 414b is to be performed is the area displayed via a dot-dash line.

In the present embodiment, when the user selects the reduction level, the CPU 201 performs the process at the selected reduction level for the region corresponding to the reduction level. Furthermore, the CPU 201 displays the post-process image in the image display region 411 of the inspection settings UI 410.

Figure 12:
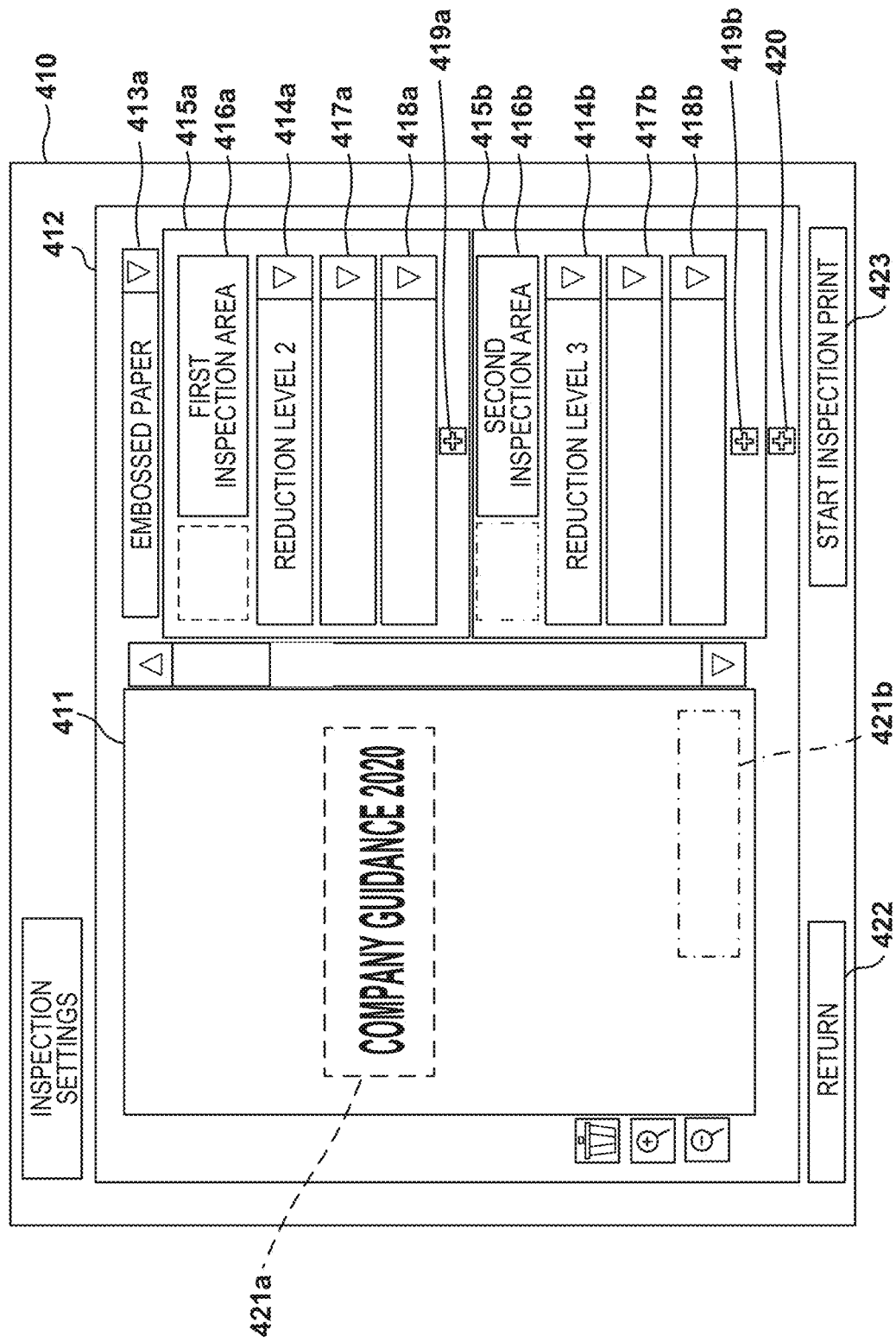
FIG. 12 is a diagram for describing inspection settings.

FIG. 12 is a diagram illustrating the inspection settings UI 410 in a case when the reduction level is different for each inspection area. As illustrated in FIG. 12, in a case when the reduction level for the first inspection area 421a is 2 and the reduction level for the second inspection area 421b is 3, the "Company Information" image is not removed. However, the image of the characters "2020/XX/XX" has been removed.

The user sets the reduction level while looking at the image displayed in the image display region 411. In other words, the user can set the reduction level while checking whether or not an image in the inspection area has been removed by the reduction process. For example, in the case of the image illustrated in FIG. 12, the user can change the reduction level applied to the second inspection area 421b to a 2 or a 1. This would make the image of the characters "2020/XX/XX" not be removed.

In the present embodiment, in a case when embossed paper is selected as the type of sheet that is the inspection target, the reduction level is set for each set inspection area. Instances of recesses and protrusions causing a determination of a defect are reduced by the reduction process.

In the present embodiment, the reduction level for the reduction process can be selected. When the reduction level is selected, the process at the select reduction level is applied to the image of the specified inspection area. Furthermore, the image on which the reduction process at the selected reduction level has been applied is displayed in the image display region 411 of the inspection settings UI 410. This allows the user to set the reduction level while looking at the image displayed in the image display region 411. In other words, the user can set the reduction level while checking that the image (for example, "2020/XX/XX") that is the inspection target is not removed by the reduction process for each inspection area. This can help prevent the image that is the inspection target from being unable to be appropriately inspected.

In the present embodiment, the inspection levels that are selectable for each set inspection area on the basis of the selected inspection matter and the reduction level are displayed. For example, non-selectable inspection levels may be grayed out. In other words, in the present embodiment, for each set inspection area, a combination of the reduction level and the inspection level can be set. This helps prevent erroneous determinations caused by shadows. For example, this reduces the number of instances in which, even if the image formed on the sheet P is not a defect, the recesses and protrusions may cause a determination of a defect. Note that the combinations of the reduction level and the inspection level are described in the first embodiment, and thus description thereof will be omitted from the second embodiment.

In this manner, according to the present embodiment, an image inspection is performed using a reduction level appropriate for the type of the sheet P and the inspection level. Thus, erroneous determinations can be reduced, and the product yield rate can be better than that of known techniques.

Third Embodiment

Descriptions of the configurations in the image inspection system 100 according to the third embodiment that are the same as or similar to the configurations described in the first embodiment or the second embodiment are omitted. In other words, the descriptions in the first embodiment and the second embodiment are invoked for these configurations.

In the first embodiment, the inspection levels that are selectable on the basis of the selected inspection matter and the reduction level are displayed. In other words, the non-selectable inspection levels are grayed out. In the present embodiment, the reduction levels that are selectable on the basis of the selected inspection matter and the inspection level are displayed. In other words, the non-selectable reduction levels are grayed out.

Inspection Settings UI

Figure 13:
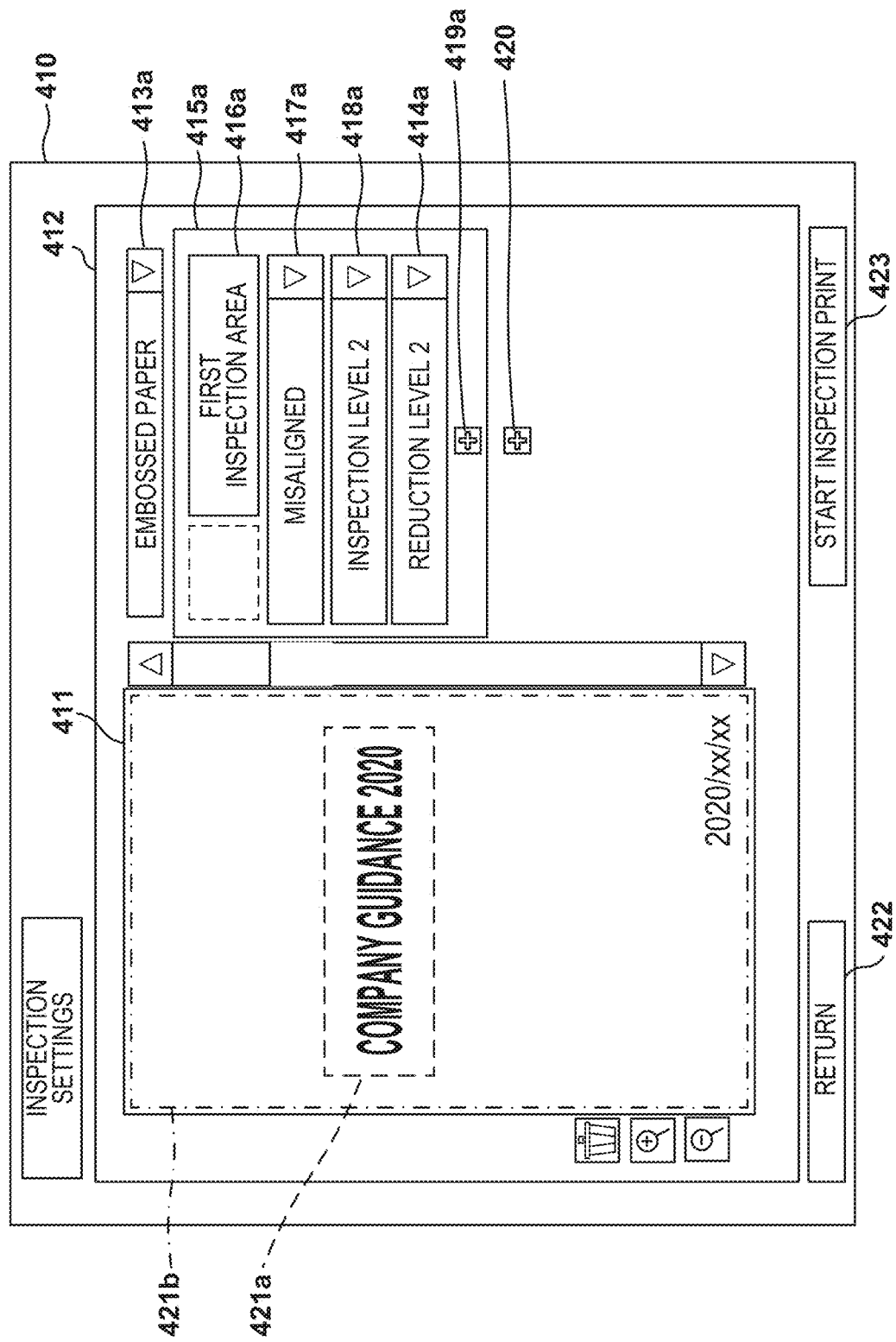
FIG. 13 is a diagram for describing inspection settings.

FIG. 13 illustrates an example of the inspection settings UI 410 according to the present embodiment. As illustrated in FIG. 13, the inspection settings UI 410 includes the image display region 411 and the detailed settings region 412.

The detailed settings region 412 is a region where one or more inspection settings are displayed and inspection settings are received. The sheet menu 413a displays a list of candidates for the type of the sheet P (for example, thick paper, plain paper, thin paper, gloss paper, and embossed paper) and receives the specification of the type of the sheet P from the user. The CPU 201 (reception unit 204) stores the type of the sheet P selected from the sheet menu 413a in the inspection settings data 212.

When the type of the sheet P is specified from the sheet menu 413a, the CPU 201 may switch the settings region 415a from a non-interactive state to an interactive state. The settings region 415a includes the set area button 416a, the reduction level menu 414a, the matter menu 417a, and the inspection level menu 418a.

The following description focuses on an example in which embossed paper is specified from the sheet menu 413a.

The set area button 416a displays the names of the inspection areas. There is an indicator that an inspection area 421a is displayed via a dashed line to the left of the set area button 416a. When the set area button 416a is pressed, the CPU 201 (reception unit 204) receives the specification of the inspection area 421a input by a user in the image display region 411.

The matter menu 417a displays the inspection matter candidates and receives the specification of the inspection matter by the user. The CPU 201 (reception unit 204) stores the inspection matter selected from the matter menu 417a in the inspection settings data 212.

When the inspection matter is specified from the matter menu 417a, the CPU 201 may switch the inspection level menu 418a from a non-interactive state to an interactive state. The inspection level menu 418a displays the inspection level candidates and receives the user-specified inspection level. The CPU 201 (reception unit 204) stores the inspection level selected from the inspection level menu 418a in the inspection settings data 212.

The reduction level menu 414a displays the reduction level candidates and receives the specification of one reduction level therefrom. There are types (for example, thick paper, plain paper, and thin paper) of the sheet P specified by the user via the sheet menu 413a that the reduction process cannot be applied to. In such cases, the CPU 201 may gray out the reduction level menu 414a, making the user unable to interact with it. When the reduction level is specified, a reference image for which the process at the specified reduction level has been performed is displayed in the image display region 411.

Note that the layout of the selection items of the inspection settings UI 410 in FIG. 13 is merely an example according to the present embodiment, and no such limitation is intended.

Combining the Reduction Level and Inspection Level

In a case when the inspection level is high and the reduction level is low, the likelihood of shadows causing an erroneous determination is increased. For example, even if the image formed on the sheet P is not a defect, the recesses and protrusions may cause a determination of a defect.

Figure 14A:
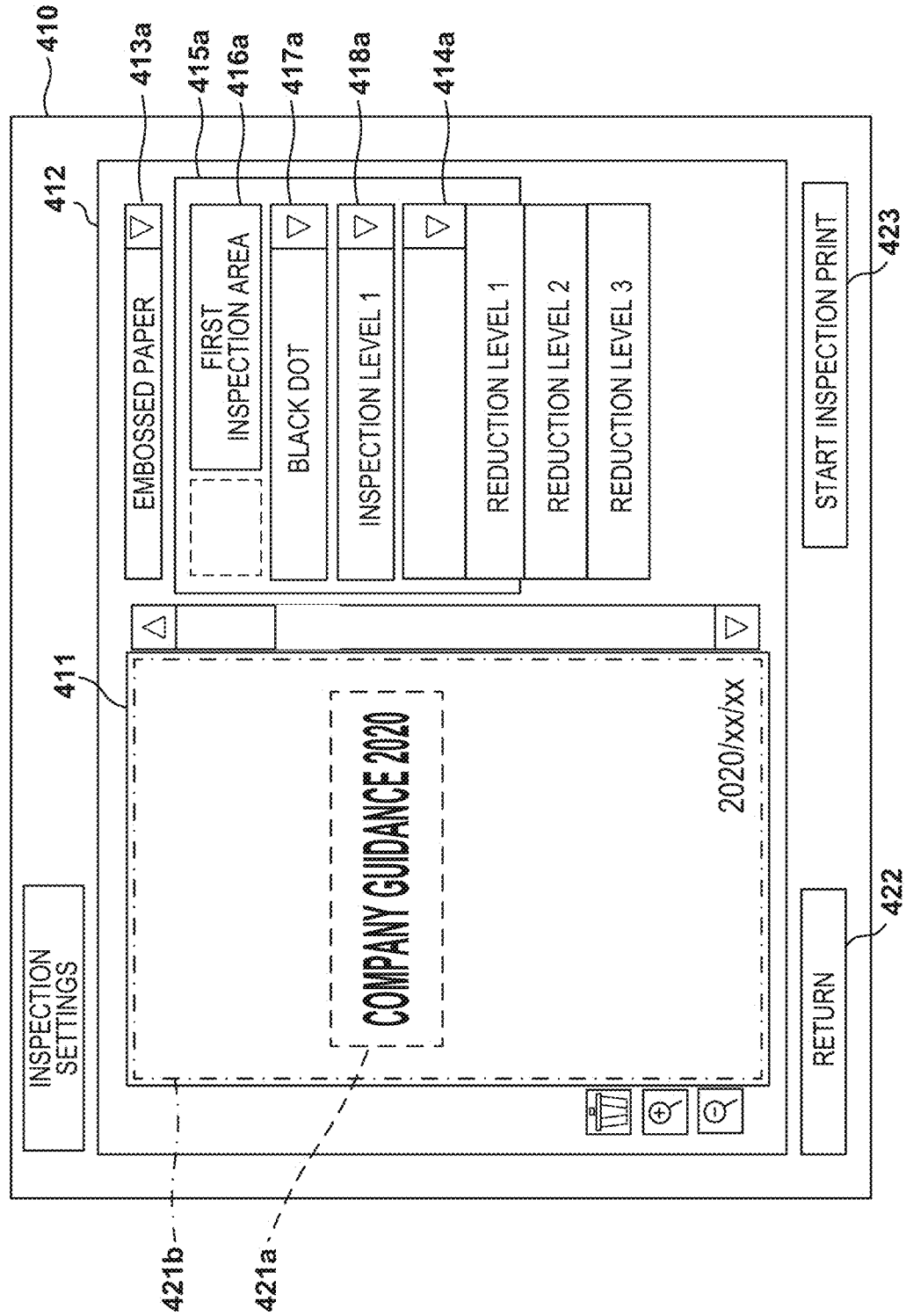

FIGS. 14A and 14B are diagrams illustrating the inspection settings UI 410 when black dot detection is selected as the inspection matter. FIG. 14A is a diagram illustrating the inspection settings UI 410 in a case where black dot detection is selected as the inspection matter and an inspection level of 1 is set. FIG. 14B is a diagram illustrating the inspection settings UI 410 in a case when black dot detection is selected as the inspection matter and an inspection level of 2 is set.

As illustrated in FIG. 14A, black dot detection may be selected as the inspection matter and the inspection level may be set to 1. In this case, when the reduction level menu 414a is pressed, the CPU 201 displays a pull-down list (menu) of the reduction levels. As listed in the table of FIG. 6A, in a case when black dot detection is selected as the inspection matter and an inspection level of 1 is set, the reduction levels of 1, 2, and 3 all result in "OK". Thus, the user can select 1, 2, or 3 as the reduction level. On the other hand, as listed in the table of FIG. 6A, in a case when black dot detection is selected as the inspection matter and an inspection level of 2 is set, only the reduction level of 3 results in "OK". The reduction levels of 1 and 2 result in "defect". In the present embodiment, the CPU 201 does not receive a user selection of an option resulting in "defect". In other words, as illustrated in FIG. 14B, in a case when black dot detection is selected as the inspection matter and an inspection level of 2 is set, the CPU 201 grays out the reduction levels 1 and 2. This prevents the user from selecting the reduction levels 1 and 2. Thus, the user can only select 3 as the reduction level. In this manner, in the present embodiment, in a case when black dot detection is the inspection matter, determination processing where the reduction level corresponding to the intensity of the image editing process is a first intensity (for example, 1) and the inspection level corresponding to the determination threshold is a second value (for example, 2 or 3) is not executed. Also, in a case when black dot detection is the inspection matter, determination processing where the reduction level corresponding to the intensity of the image editing process is a first intensity (for example, 1) and the inspection level corresponding to the determination threshold is a first value (for example, 1) is executed. Also, in a case when black dot detection is the inspection matter, determination processing where the reduction level corresponding to the intensity of the image editing process is a second intensity (for example, 2) and the inspection level corresponding to the determination threshold is a second value (for example, 2 or 3) is not executed. Also, in a case when black dot detection is the inspection matter, determination processing where the reduction level corresponding to the intensity of the image editing process is a second intensity (for example, 2) and the inspection level corresponding to the determination threshold is a first value (for example, 1) is executed.

FIGS. 15A and 15B are diagrams illustrating the inspection settings UI 410 when misalignment detection is selected as the inspection matter. FIG. 15A is a diagram illustrating the inspection settings UI 410 in a case when misalignment detection is selected as the inspection matter and an inspection level of 1 is set. FIG. 15B is a diagram illustrating the inspection settings UI 410 in a case when misalignment detection is selected as the inspection matter and an inspection level of 2 is set.

As illustrated in FIG. 15A, misalignment detection may be selected as the inspection matter and the inspection level may be set to 1. In this case, when the reduction level menu 414a is pressed, the CPU 201 displays a pull-down list (menu) of the reduction levels. As listed in the table of FIG. 6B, in a case when misalignment detection is selected as the inspection matter and an inspection level of 1 is set, the reduction levels of 1, 2, and 3 all result in "OK". Thus, the user can select 1, 2, or 3 as the reduction level. On the other hand, as listed in the table of FIG. 6B, in a case when misalignment detection is selected as the inspection matter and an inspection level of 2 is set, only the reduction levels of 2 and 3 result in "OK". In other words, the reduction level of 1 results in "defect". In the present embodiment, the CPU 201 does not allow the user to select an option resulting in "defect". In other words, as illustrated in FIG. 15B, in a case when misalignment detection is selected as the inspection matter and an inspection level of 2 is set, the CPU 201 grays out the reduction level 1. This prevents the user from selecting the reduction level 1. Thus, the user can select 2 or 3 as the reduction level. In this manner, in the present embodiment, in a case when misalignment detection is the inspection matter, determination processing where the reduction level corresponding to the intensity of the image editing process is a first intensity (for example, 1) and the inspection level corresponding to the determination threshold is a second value (for example, 3) is not executed. Also, in a case when misalignment detection is the inspection matter, determination processing where the reduction level corresponding to the intensity of the image editing process is a first intensity (for example, 1) and the inspection level corresponding to the determination threshold is a first value (for example, 1) is executed. Also, in a case when misalignment detection is the inspection matter, determination processing where the reduction level corresponding to the intensity of the image editing process is a second intensity (for example, 2) and the inspection level corresponding to the determination threshold is a second value (for example, 3) is not executed. Also, in a case where misalignment detection is the inspection matter, determination processing where the reduction level corresponding to the intensity of the image editing process is a second intensity (for example, 2) and the inspection level corresponding to the determination threshold is a first value (for example, 1) is executed.

Setting the Reduction Level

In a case when the type of the sheet P is embossed paper, by the user setting the reduction level to a high reduction level, shadows are removed from the reading result of the sheet P. This helps prevent erroneous determinations caused by recesses and protrusions. On the other hand, when the reduction level is set to a high reduction level, a printed image may also be removed. For example, in the example illustrated in FIG. 5D, the half-tone image characters "2020/XX/XX" are removed by the reduction process. In a case when "2020/XX/XX" is selected as the inspection target, this means that "2020/XX/XX" cannot be appropriately inspected.

Thus, in the present embodiment, when the user selects a reduction level from the reduction level menu 414a, an image for which the process at the selected reduction level has been performed is displayed in the image display region 411 of the inspection settings UI 410. Specifically, in a case when 1 is selected for the reduction level, the image of FIG. 5B is displayed in the image display region 411 of the inspection settings UI 410. Also, in a case when 2 is selected for the reduction level, the image of FIG. 5C is displayed in the image display region 411 of the inspection settings UI 410. In a case when 3 is selected for the reduction level, the image of FIG. 5D is displayed in the image display region 411 of the inspection settings UI 410.

The user sets the reduction level while looking at the image displayed in the image display region 411. In other words, the user can set the reduction level while checking that the image (for example, "2020/XX/XX") that is the inspection target is not removed by the reduction process. This can help prevent the image that is the inspection target from being unable to be appropriately inspected.

Note that the configurations of the present embodiment and the configurations (configurations for setting the reduction level for each inspection area) of the second embodiment may be combined.

Fourth Embodiment

Descriptions of the configurations in the image inspection system 100 according to the fourth embodiment that are the same or similar to the configurations described in the first embodiment to the third embodiment are omitted. In other words, the descriptions in the first embodiment to the third embodiment are invoked for these configurations.

In the first embodiment, the inspection levels that are selectable on the basis of the selected inspection matter and the reduction level are displayed. Also, non-selectable inspection levels are grayed out. In the present embodiment, after the reduction level, the inspection matter, and the inspection level are selected, the CPU 201 sends a warning to the user on the basis of the combination table 214.

Figure 16:
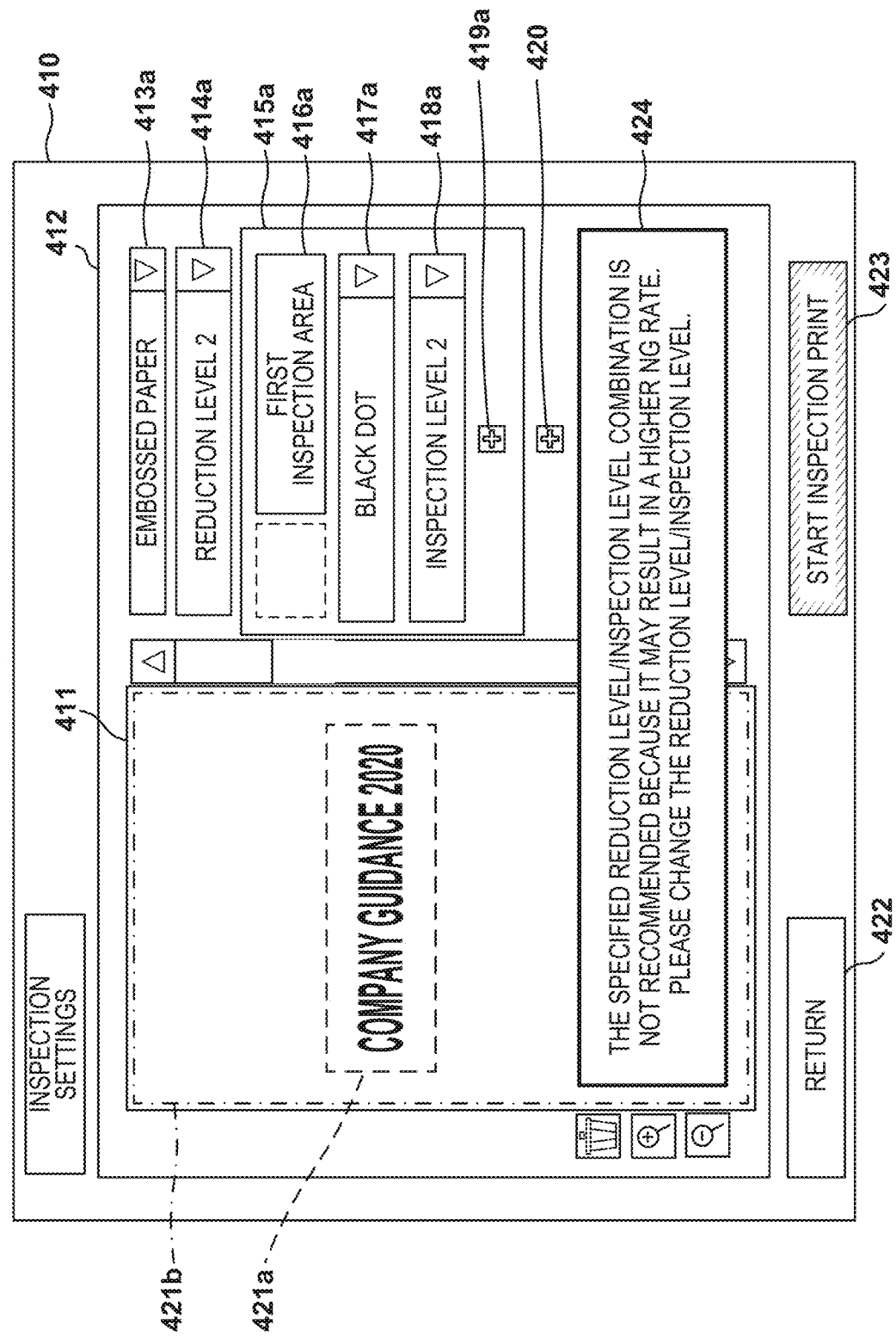
FIG. 16 is a diagram for describing inspection settings.

FIG. 16 is a diagram illustrating the inspection settings UI 410 in a case when black dot detection is specified as the inspection matter, the reduction level is set to 2, and the inspection level is set to 2. As illustrated in the combination table 214 of FIG. 6A, in a case when the inspection matter is black dot detection, the reduction level is 2, and the inspection level is 2, the result is "defect". Thus, when black dot detection is specified as the inspection matter, the reduction level is set to 2, and the inspection level is set to 2, the CPU 201 displays a dialog 424 or the like in the inspection settings UI 410. Specifically, the CPU 201 displays information indicating that the specified reduction level and inspection level combination is not recommended and information indicating the likelihood of the current combination resulting in a low yield rate (high defect rate). The CPU 201 may notify the user prompting the user to change the reduction level and the inspection level.

In this manner, the CPU 201 communicates the information described above on the basis of the specified reduction level and inspection level combination and the information of the combination table 214.

In the present embodiment, when the reduction level and the inspection level combination is a combination that results in "defect" in the combination table 214, the inspection print start button 423 is grayed out. In other words, in the present embodiment, when the reduction level and the inspection level combination is a combination that results in "defect" in the combination table 214, a print job with an inspection (determination job) cannot be started. In other words, in the present embodiment, in a case when black dot detection is the inspection matter, determination processing where the reduction level corresponding to the intensity of the image editing process is a first intensity (for example, 1) and the inspection level corresponding to the determination threshold is a second value (for example, 2 or 3) is not executed. Also, in a case when black dot detection is the inspection matter, determination processing where the reduction level corresponding to the intensity of the image editing process is a first intensity (for example, 1) and the inspection level corresponding to the determination threshold is a first value (for example, 1) is executed. Also, in a case where black dot detection is the inspection matter, determination processing where the reduction level corresponding to the intensity of the image editing process is a second intensity (for example, 2) and the inspection level corresponding to the determination threshold is a second value (for example, 2 or 3) is not executed. Also, in a case when black dot detection is the inspection matter, determination processing where the reduction level corresponding to the intensity of the image editing process is a second intensity (for example, 2) and the inspection level corresponding to the determination threshold is a first value (for example, 1) is executed. On the other hand, in a case when misalignment detection is the inspection matter, determination processing where the reduction level corresponding to the intensity of the image editing process is a first intensity (for example, 1) and the inspection level corresponding to the determination threshold is a second value (for example, 3) is not executed. Also, in a case when misalignment detection is the inspection matter, determination processing where the reduction level corresponding to the intensity of the image editing process is a first intensity (for example, 1) and the inspection level corresponding to the determination threshold is a first value (for example, 1) is executed. Also, in a case when misalignment detection is the inspection matter, determination processing where the reduction level corresponding to the intensity of the image editing process is a second intensity (for example, 2) and the inspection level corresponding to the determination threshold is a second value (for example, 3) is not executed. Also, in a case when misalignment detection is the inspection matter, determination processing where the reduction level corresponding to the intensity of the image editing process is a second intensity (for example, 2) and the inspection level corresponding to the determination threshold is a first value (for example, 1) is executed.

As described above, in the present embodiment, that a print job with an inspection cannot be started on the basis of the selected inspection matter and reduction level is communicated via a grayed out display. This helps prevent erroneous determinations caused by shadows. For example, this reduces the number of instances in which, even if the image formed on the sheet P is not a defect, the recesses and protrusions may cause a determination of a defect.

In this manner, according to the present embodiment, an image inspection is performed using a reduction level appropriate for the type of the sheet P and the inspection level. Thus, erroneous determinations can be reduced, and the product yield rate can be better than that of known techniques.

Note that the configurations of the present embodiment may be applied to the second embodiment and the third embodiment.

Fifth Embodiment

Descriptions of the configurations in the image inspection system 100 according to the fifth embodiment that are the same as or similar to the configurations described in the first embodiment to the fourth embodiment are omitted. In other words, the descriptions in the first embodiment to the fourth embodiment are invoked for these configurations.

FIG. 17 is a diagram illustrating the inspection settings UI 410 in a case where black dot detection is specified as the inspection matter, the reduction level is set to 2, and the inspection level is set to 2. As illustrated in the combination table 214 of FIG. 6A, in a case when the inspection matter is black dot detection, the reduction level is 2, and the inspection level is 2, the result is "defect". Thus, when black dot detection is specified as the inspection matter, the reduction level is set to 2, and the inspection level is set to 2, the CPU 201 displays the dialog 424 in the inspection settings UI 410. Specifically, the CPU 201 displays information indicating that the specified reduction level and inspection level combination is not recommended and information indicating the likelihood of the current combination resulting in a low yield rate (high defect rate). Also, the CPU 201 may notify the user prompting the user to change the reduction level and/or the inspection level.

In this manner, the CPU 201 communicate the information described above on the basis of the specified reduction level and inspection level combination and the information of the combination table 214.

In the present embodiment, when the reduction level and the inspection level combination is a combination that results in "defect" in the combination table 214, the inspection print start button 423 is able to be pressed. In other words, in the present embodiment, even when the reduction level and the inspection level combination is a combination that results in "defect" in the combination table 214, the CPU 201 allows a print job with an inspection to be started.

Sixth Embodiment

Inspection Result Feedback

The CPU 201 (updating unit 250) analyzes the performance data 215 and changes the combination table 214 to reduce the number of combinations that result in "defect" in FIGS. 6A and 6B in a case when such combinations have a high enough yield rate (for example, 95% or greater). For example, a case when the inspection matter is black dot detection, the reduction level is 2, and the inspection level is 2 may result in a yield rate higher than a predetermined value. In this case, the data in the combination table 214 relating to a case when the inspection matter is black dot detection, the reduction level is 2, and the inspection level is 2 is changed to "OK" by the CPU 201. There are many types of embossed paper circulating in the market. Thus, the depth of the protrusions and recesses on the embossed paper is also varied. Because of this, the CPU 201 may generate a database of both the sheet information and the yield rate included in the performance data 215. For example, the CPU 201 may receive the brand of the embossed paper via the input apparatus 22 and store the combination table 214 for each brand of embossed paper in the memory 210. In this manner, the CPU 201 may switch the combination table 214 in accordance with the brand specified by the user.

As described above, in the present embodiment, that a print job with an inspection can be started irrespective of what inspection matter and reduction level are selected. In a case when the yield rate of a print job with an inspection executed with a combination resulting in a defect in the combination table 214 is higher than the predetermined value, the CPU 201 (updating unit 250) changes "defect" in the combination table 214 to "OK". In this manner, by updating the combination table 214 in response to the paper used by the user, the number of combinations of the type of sheet usable by the user, the reduction level, and the inspection level can be increased, improving usability.

Note that in the first embodiment to the fifth embodiment, the reduction process includes a process of reducing shadows produced by the recesses and protrusions on embossed paper. However, no such limitation is intended. For example, a process of reducing the patterns when performing an inspection of the quality of an image formed on a patterned sheet may be used as the reduction process. Also, shadows produced by recesses and protrusions may be referred to as patterns.

Technical Ideas Derived from Embodiments

Perspective A1

The image forming apparatus 30 is an example of an image forming unit that forms an image on the sheet P. The image sensors 52a and 52b are examples of a reading unit provided downstream from the image forming unit in a conveyance direction in which the sheet P is conveyed, the reading unit being configured to read an image on the sheet P conveyed from the image forming unit. The CPU 201 and 301 are examples of one or more processors. The one or more processors are configured to generate image data representing a result of the reading unit reading an image on the sheet P, set an intensity of an image editing process applied to the image data, and execute determination processing to, on the basis of a determination threshold, determine a degree of match between an image corresponding to reference data and an image corresponding to the image data on which the image editing process has been applied. Here, determining a degree of match corresponds to detecting black dots, detecting misalignment, and the like, for example. The reference data is image data corresponding to a determination reference used in the determination processing. The determination threshold is set by the one or more processors. As described above, setting the inspection level corresponds to setting the determination threshold.

As illustrated in the example of FIG. 6A and the like, the one or more processors execute the determination processing with the intensity of the image editing process being a first intensity (for example, reduction level 1) and the determination threshold being a first value (for example, inspection level 1) and do not execute the determination processing with the intensity of the image editing process being the first intensity and the determination threshold being a second value (for example, inspection level 2) less than the first value. The one or more processors execute the determination processing with the intensity of the image editing process being a second intensity (for example, reduction level 2) greater than the first intensity and the determination threshold being the first value (for example, inspection level 1) and do not execute the determination processing with the intensity of the image editing process being the second intensity (for example, reduction level 2) and the determination threshold being the second value (for example, inspection level 2).

Perspective A2

In the image inspection system according to Perspective A1, as in the example described in the first embodiment, the one or more processors may prohibit the determination threshold from being set to the second value and may allow the determination threshold to be set to the first value in a case when the intensity of the image editing process is set to the first intensity. The one or more processors may prohibit the determination threshold from being set to the second value and may allow the determination threshold to be set to the first value in a case when the intensity of the image editing process is set to the second intensity.

Perspective A3

The image inspection system according to Perspective A1 or A2 may further include a display unit configured to display a screen for receiving an input of a setting for the intensity and a setting for the determination threshold for the image editing process. The one or more processors may prohibit the second value from being selected on a settings screen for the determination threshold of the display unit and may allow the first value to be set on the settings screen in a case when the intensity of the image editing process is set to the first intensity. The one or more processors may prohibit the second value from being selected on a settings screen for the determination threshold of the display unit and may allow the first value to be set on the settings screen in a case when the intensity of the image editing process is set to the second intensity.

Perspective A4

In the image inspection system according to Perspective A3, prohibiting the second value from being selected may correspond to graying out an option corresponding to the second value on the settings screen for the determination threshold of the display unit.

Perspective A5

In the image inspection system according to Perspective A1, as in the example described in the third embodiment, the one or more processors may prohibit the intensity of the image editing process from being set to the first intensity and the second intensity in a case where the determination threshold is set to the second value.

The one or more processors may allow the intensity of the image editing process to be set to the first intensity and the second intensity in a case where the determination threshold is set to the first value.

Perspective A6

The image inspection system according to Perspective A1 or A5 may further include a display unit configured to display a screen for receiving an input of a setting for the intensity and a setting for the determination threshold for the image editing process. The one or more processors may prohibit the first intensity and the second intensity from being selected on a settings screen for the intensity of the image editing process of the display unit in a case where the determination threshold is set to the second value. The one or more processors may allow the first intensity and the second intensity to be selected on a settings screen for the intensity of the image editing process of the display unit in a case when the determination threshold is set to the first value.

Perspective A7

In the image inspection system according to Perspective A6, prohibiting the first intensity and the second intensity from being selected may correspond to graying out options corresponding to the first intensity and the second intensity on the settings screen for the determination threshold of the display unit.

Perspective A8

In the image inspection system according to Perspective A1, as in the example described in the fourth embodiment, the one or more processors may be configured to receive an instruction to start the determination processing. When the instruction is received, the one or more processors may control the reading unit to read an image on the sheet P and execute the determination processing. The one or more processors may prohibit the determination processing from starting in a case when the intensity of the image editing process is set to the first intensity and the determination threshold is set to the second value. The one or more processors may allow the determination processing to start in a case when the intensity of the image editing process is set to the first intensity and the determination threshold is set to the first value. The one or more processors may prohibit the determination processing from starting in a case when the intensity of the image editing process is set to the second intensity and the determination threshold is set to the second value. The one or more processors may allow the determination processing to start in a case when the intensity of the image editing process is set to the second intensity and the determination threshold is set to the first value.

Perspective A9

The image inspection system according to Perspective A8 may further include a display unit configured to display a screen for receiving an input of the instruction. The one or more processors may prohibit the instruction from being input on the display unit in a case when the intensity of the image editing process is set to the first intensity and the determination threshold is set to the second value. The one or more processors may allow the instruction to be input on the display unit in a case when the intensity of the image editing process is set to the first intensity and the determination threshold is set to the first value. The one or more processors may prohibit the instruction from being input on the display unit in a case when the intensity of the image editing process is set to the second intensity and the determination threshold is set to the second value. The one or more processors may allow the instruction to be input on the display unit in a case when the intensity of the image editing process is set to the second intensity and the determination threshold is set to the first value.

Perspective A10

In the image inspection system according to Perspective A9, prohibiting the instruction from being input may correspond to graying out a button for inputting the instruction of the display unit.

Perspective A11

The image inspection system according to any one of Perspectives A8 to A10 may further include a notification unit configured to notify a user of information. The notification unit may notify the user prompting the user to change the intensity and/or the determination threshold for the image editing process in a case when the intensity of the image editing process is set to the first intensity and the determination threshold is set to the second value. The notification unit may notify the user prompting the user to change the intensity and/or the determination threshold for the image editing process in a case when the intensity of the image editing process is set to the second intensity and the determination threshold is set to the second value.

Perspective A12

In the image inspection system according to any one of Perspectives A1 to A11, the one or more processors may be configured to receive information relating to a type of the sheet P. The one or more processors set the intensity and the determination threshold of the image editing process in a case when the sheet P is a first type of sheet P and do not set the intensity and the determination threshold of the image editing process in a case when the sheet P is a second type of sheet P.

Perspective A13

In the image inspection system according to Perspective A12, the second type of sheet P may be embossed paper with recesses and protrusions on a surface.

Perspective A14

In the image inspection system according to any one of Perspectives A1 to A13, the reading unit may include a light source (for example, a light-emitting diode) configured to emit light and a reading sensor configured to receive light emitted from the light source and reflected at the sheet P.

The image data represents a result of the reading sensor reading an image on the sheet P. The image editing process may be a process including changing a value of image data less than a threshold to a predetermined value. The threshold in a case when the intensity of the image editing process is the first intensity may be less than the threshold in a case when the intensity of the image editing process is the second intensity.

Perspective A15

In the image inspection system according to any one of Perspectives A1 to A14, as in the example described in the second embodiment, the one or more processors may be configured to receive a setting for an area, in an image corresponding to the image data, corresponding to a target of the determination processing, a setting for the intensity of the image editing process for the area, and a setting for the determination threshold for the area. The one or more processors may apply the image editing process at the set intensity to an image in the set area. The one or more processors may execute the determination processing on the basis of the set determination threshold on an image in the area on which the image editing process has been applied.

Perspective A16

In the image inspection system according to any one of Perspectives A1 to A15, the reference data may be image data obtained by the reading unit reading a sheet P on which an image has been formed by the image forming unit.

Perspective A17

The image inspection system according to Perspective A16 may further include a display unit configured to display an image corresponding the reference data on which the image editing process at a set intensity has been applied.

Perspective A18

In the image inspection system according to any one of Perspectives A1 to A17, the reference data may be image data transmitted from a host computer external to the image inspection system.

Perspective A19

In the image inspection system according to any one of Perspectives A1 to A18, the one or more processors, in the determination processing, may determine whether or not a distance between an image corresponding to the reference data and an image corresponding to the image data on which the image editing process has been performed is less than a determination distance used as the determination threshold.

Perspective A20

The image inspection system according to Perspective A19 may further include a first discharge loading unit provided downstream of the reading unit in the conveyance direction, the first discharge loading unit being configured to be loaded with the sheet P for which the distance has been determined to be less than the determination distance; and a second discharge loading unit provided downstream of the reading unit in the conveyance direction, the first discharge loading unit being configured to be loaded with the sheet P for which the distance has been determined to be greater than the determination distance.

Perspective A21

In the image inspection system according to any one of Perspectives A1 to A20, the one or more processors, in the determination processing, may determine whether or not a size of a noise image not in an image corresponding to the reference data and in an image corresponding to the image data on which the image editing process has been performed is less than a determination size used as the determination threshold.

Perspective A22

The image inspection system according to Perspective A21 may further include a first discharge loading unit provided downstream of the reading unit in the conveyance direction, the first discharge loading unit being configured to be loaded with the sheet P for which the size of the noise image has been determined to be less than the determination size, and a second discharge loading unit provided downstream of the reading unit in the conveyance direction, the first discharge loading unit being configured to be loaded with the sheet P for which the size of the noise image has been determined to be greater than the determination size.

Perspective A23

As described in the first to fourth embodiments, the CPU 201 and 301 are examples of one or more processors. The one or more processors are configured to generate image data representing a result of a reading unit reading an image on a sheet P, to set an intensity of an image editing process applied to the image data, to set an intensity of an image editing process applied to the image data, to execute a first determination processing to determine, on the basis of a first determination threshold, a first degree of match between an image corresponding to reference data and an image corresponding to the image data on which the image editing process has been applied, and execute a second determination processing to determine, on the basis of a second determination threshold, a second degree of match between an image corresponding to the reference data and an image corresponding to the image data on which the image editing process has been applied. The reference data is image data corresponding to a determination reference used in the first determination processing and the second determination processing. The one or more processors setting a determination level indicating a level of determination in the first determination processing and the second determination processing.

Here, the first determination threshold is a first value and the second determination threshold is a third value in a case when the determination level is a first determination level. The first determination threshold is a second value less than the first value and the second determination threshold is a fourth value less than the third value in a case when the determination level is a second determination level. The one or more processors do not execute the first determination processing with the intensity of the image editing process being a first intensity and the determination level being the first determination level and execute the second determination processing with the intensity of the image editing process being the first intensity and the determination level being the second determination level. For example, as illustrated in FIGS. 6A and 6B, when the inspection level is 2 and the reduction level is 2, black dot detection is prohibited, but misalignment detection is allowed.

Perspective A24

In the image inspection system according to Perspective A23, the one or more processors may execute the first determination processing with the intensity of the image editing process being a second intensity greater than the first intensity and the determination level being the first determination level and may execute the second determination processing with the intensity of the image editing process being the second intensity and the determination level being the first determination level. For example, when the reduction level is 3 and the inspection level is 2, both black dot detection and misalignment detection are allowed.

Perspective A25

In the image inspection system according to Perspective A23 or A24, the one or more processors may not execute the first determination processing with the intensity of the image editing process being the first intensity and the determination level being the second determination level and may execute the second determination processing with the intensity of the image editing process being the first intensity and the determination level being the second determination level. For example, when the reduction level is 2 and the inspection level is 3, both black dot detection and misalignment detection are prohibited.

Perspective A26

In the image inspection system according to any one of Perspectives A23 to A25, the one or more processors may prohibit the determination level from being set to the first determination level in a case when, in the first determination processing, the intensity of the image editing process is set to the first intensity.

The one or more processors may allow the determination level to be set to the first determination level in a case when, in the second determination processing, the intensity of the image editing process is set to the first intensity.

Perspective A27

The image inspection system according to any one of Perspectives A23 to A26 may further include a display unit configured to display a screen for receiving an input of a setting for the intensity and a setting for the determination level for the image editing process. The one or more processors may prohibit the first determination level from being selected on a settings screen for the determination level of the display unit in a case when, in the first determination processing, the intensity of the image editing process is set to the first intensity. The one or more processors may allow the first determination level to be selected on a settings screen for the determination level of the display unit in a case when, in the second determination processing, the intensity of the image editing process is set to the first intensity.

Perspective A28

In the image inspection system according to Perspective A27, prohibiting the first determination level value from being selected may correspond to graying out an option corresponding to the first determination level on the settings screen for the determination level displayed on the display unit.

Perspective A29

In the image inspection system according to Perspective A23, the one or more processors may prohibit the intensity of the image editing process from being set to the first intensity in a case when, in the first determination processing, the determination level is set to the first determination level. The one or more processors may allow the intensity of the image editing process to be set to the first intensity in a case when, in the second determination processing, the determination level is set to the first determination level.

Perspective A30

The image inspection system according to Perspective A23 or A29 may further include a display unit configured to display a screen for receiving an input of a setting for the intensity and a setting for the determination level for the image editing process. The one or more processors may prohibit the first intensity from being selected on a settings screen for the intensity of the image editing process of the display unit in a case when, in the first determination processing, the determination level is set to the first determination level. The one or more processors may allow the first intensity to be selected on a settings screen for the intensity of the image editing process of the display unit in a case when, in the second determination processing, the determination level is set to the first determination level.

Perspective A31

In the image inspection system according to Perspective A30, prohibiting the first intensity from being selected may correspond to graying out an option corresponding to the first intensity on the settings screen for the determination level of the display unit.

Perspective A32

In the image inspection system according to Perspective A23, as in the example described in the fourth embodiment, the one or more processors may be configured to receive an instruction to start a determination job. When the instruction is received, the one of more processors control the image forming unit to form an image on the sheet P, control the reading unit to read an image on the sheet P, and execute the first determination processing or the second determination processing. The one or more processors may prohibit the determination job from starting in a case when, in the first determination processing, the intensity of the image editing process is set to the first intensity and the determination level is set to the first determination level. The one or more processors may allow the determination job to start in a case when, in the second determination processing, the intensity of the image editing process is set to the first intensity and the determination level is set to the first determination level.

Perspective A33

The image inspection system according to Perspective A32 may further include a display unit configured to display a screen for receiving an input of the instruction. The one or more processors may prohibit the instruction from being input on the display unit in a case when, in the first determination processing, the intensity of the image editing process is set to the first intensity and the determination level is set to the first determination level. The one or more processors may allow the instruction to be input on the display unit in a case when, in the second determination processing, the intensity of the image editing process is set to the first intensity and the determination level is set to the first determination level.

Perspective A34

In the image inspection system according to Perspective A33, prohibiting the instruction from being input may correspond to graying out a button for inputting the instruction of the display unit.

Perspective A35

The image inspection system according to any one of Perspectives A32 to A34 may further include a notification unit configured to notify a user of information. The notification unit notifies the user prompting the user to change the intensity and/or the determination level for the image editing process in a case when, in the first determination processing, the intensity of the image editing process is set to the first intensity and the determination level is set to the first determination level. The notification unit notifies the user prompting the user to change the intensity and/or the determination level for the image editing process in a case when, in the second determination processing, the intensity of the image editing process is set to the first intensity and the determination level is set to the first determination level.

Perspective A36

In the image inspection system according to any one of Perspectives A23 to A35, the one or more processors may be configured to receive information relating to a type of the sheet P. The one or more processors set the intensity and the determination level of the image editing process in a case when the sheet P is a first type of sheet P and do not set the intensity and the determination level of the image editing process in a case when the sheet P is a second type of sheet P.

Perspective A37

In the image inspection system according to Perspective A36, the second type of sheet P is embossed paper with recesses and protrusions on a surface.

Perspective A38

In the image inspection system according to Perspective A24, the reading unit may include a light source (for example, a light-emitting diode) configured to emit light and a reading sensor configured to receive light emitted from the light source and reflected at the sheet P. The image data represents a result of the reading sensor reading an image on the sheet P. The image editing process may be a process including changing a value of image data less than a threshold to a predetermined value. The threshold in a case where the intensity of the image editing process is the first intensity may be less than the threshold in a case when the intensity of the image editing process is the second intensity.

Perspective A39

In the image inspection system according to Perspective A38, the image editing process may be a process that reduces a pattern produced on an image corresponding to the image data by recesses and protrusions on a surface of the sheet P being read.

Perspective A40

In the image inspection system according to any one of Perspectives A23 to A39, as in the example described in the second embodiment, the one or more processors may be configured to receive a setting for an area, in an image corresponding to the image data, corresponding to a target of the determination, a setting for the intensity of the image editing process for the area, and a setting for the determination level for the area. The one or more processors may apply the image editing process at the set intensity to an image in the set area. The one or more processors may execute the determination on the basis of the set determination level on an image in the area on which the image editing process has been applied.

Perspective A41

In the image inspection system according to any one of Perspectives A23 to A40, the reference data may be image data obtained by the reading unit reading a sheet P on which an image has been formed by the image forming unit.

Perspective A42

The image inspection system according to Perspective A40 may further include a display unit configured to display an image corresponding the reference data on which the image editing process at a set intensity has been applied.

Perspective A43

In the image inspection system according to any one of Perspectives A23 to A42, the reference data may be image data transmitted from a host computer external to the image inspection system.

Perspective A44

In the image inspection system according to any one of Perspectives A23 to A43, the one or more processors, in the second determination processing, may determine whether or not a distance between an image corresponding to the reference data and an image corresponding to the image data on which the image editing process has been performed is less than a determination distance used as the second determination threshold.

Perspective A45

The image inspection system according to Perspective A44 may further include a first discharge loading unit provided downstream of the reading unit in the conveyance direction, the first discharge loading unit being configured to be loaded with the sheet P for which the distance has been determined to be less than the determination distance, and a second discharge loading unit provided downstream of the reading unit in the conveyance direction, the first discharge loading unit being configured to be loaded with the sheet P for which the distance has been determined to be greater than the determination distance.

Perspective A46

In the image inspection system according to any one of Perspectives A23 to A45, the one or more processors, in the first determination processing, may determine whether or not a size of a noise image not in an image corresponding to the reference data and in an image corresponding to the image data on which the image editing process has been performed is less than a determination size used as the first determination threshold.

Perspective A47

The image inspection system according to Perspective A46 may further include a first discharge loading unit provided downstream of the reading unit in the conveyance direction, the first discharge loading unit being configured to be loaded with the sheet P for which the size of the noise image has been determined to be less than the determination size, and a second discharge loading unit provided downstream of the reading unit in the conveyance direction, the first discharge loading unit being configured to be loaded with the sheet P for which the size of the noise image has been determined to be greater than the determination size.

Perspective B1

The image forming apparatus 30 is an example of an image forming unit that forms an image on the sheet P. The image forming method may be electrophotography, an inkjet recording method, a thermal transfer method, or the like. The image sensors 52a and 52b are examples of a reading unit that generates inspection image data by reading the sheet P with an image formed. The editing unit 303 is an example of an editing unit that applies an image editing process at an editing level to the inspection image data. The inspection unit 302 functions as an image inspection unit that determines whether or not the quality of the image is a pass by performing an image inspection at the inspection level on the inspection image data on which the image editing process has been performed. The setting unit 202 and the inspection settings UI 410 are examples of a reception unit that receives a specification of a preset editing level indicating the intensity of the image editing process to be applied to the inspection image data, the inspection matter of the image inspection, and the inspection level indicating the image inspection strictness. The setting unit 202 is an example of a determination unit that determines whether or not the combination of the editing level (for example, reduction level) and the inspection level is a combination recommended for the type of sheet and the inspection matter (for example, misalignment detection). The editing level is a preset level indicating the intensity of the image editing process (for example, reduction process) to be applied to the inspection image data. The inspection level is a preset level indicating the strictness of the image inspection. The setting unit 202 and the inspection control unit 207 function as a restricting unit that restricts what combinations of the editing level and the inspection level can be specified with respect to the type of sheet and the inspection matter received by the reception unit. In this manner, the user is assisted to perform an appropriate image inspection.

Perspectives B2 to B4

The setting unit 202 may prohibit the reception of a specification of a combination of an editing level and an inspection level that is not recommended with respect to the type of sheet and the inspection matter received by the reception unit. For example, the reception unit may include a user interface (for example, the reduction level menu 414a and the inspection level menu 418a) for receiving an input of the specification of an editing level and an inspection level. The setting unit 202 may prohibit the reception of a specification of a combination of an editing level and an inspection level that is not recommended by executing control to make the user interface non-interactive. As illustrated in FIGS. 7B, 8B, 14B, and 15B, executing control to make the user interface non-interactive may include graying out the user interface.

Perspective B5

The CPU 201 (the setting unit 202 and the inspection control unit 207) is an example of a control unit that controls the image forming unit and the image inspection unit. The CPU 201 does not allow an image to be formed by the image forming unit for image inspection by the image inspection unit in a case when the combination of the editing level and the inspection level is not a recommended combination. The CPU 201 allows an image to be formed by the image forming unit for image inspection by the image inspection unit in a case when the combination of the editing level and the inspection level is a recommended combination with respect to the type of sheet. This reduces the number of erroneous determinations and saves on toner and the sheets P. Also, the yield rate is enhanced.

Perspectives B6 and B7

The image editing process may be a reduction process that reduces the affection of the surface of the sheet P in the inspection image data. In particular, the reduction process may be a process that reduces shadows produced in the inspection image data by reading recesses and protrusions on the surface of the sheet P.

Perspective B8

The determination unit (setting unit 202) may determine whether or not the combination of the editing level and the inspection level is a recommended combination with respect to the type of the sheet P on the basis of a determination condition associated with the type of the sheet P. As described in relation to FIGS. 6A and 6B, the combination table 214 is an example of a determination condition.

Perspectives B9 to B11

The yield rate calculation unit 206 functions as an obtaining unit that obtains a yield rate on the basis of the image inspection result. The updating unit 250 functions as an updating unit that updates the determination condition in accordance with the yield rate. The updating unit (for example, the updating unit 250) may update the determination condition so that higher yield rates expand the range of recommended combinations. In this manner, the yield rate can be further enhanced. The memory 210 may function as a storage unit that stores a determination condition (for example, the combination table 214) for each type of the sheet P.

Perspective B12

As described using FIG. 4B, the image inspection unit (for example, the CPU 301) may perform image inspection on an image in a preset inspection area in the inspection image data. In this manner, the inspection area is limited, allowing the effects on image inspection from the surface characteristics of the sheet P to be further reduced.

Perspectives B13 to B15

The image inspection unit (for example, the CPU 301) may determine whether or not the quality of an image is a pass by comparing reference image data (the reference data 211) corresponding to a pass criterion to the inspection image data. However, using reference image data is not required. Using reference image data makes evaluating the reproducibility of an image on the sheet P with respect to the document easier. The image inspection unit (for example, the CPU 301) may determine whether or not the quality of an image is a pass on the basis of a difference between the reference image data and the inspection image data and a threshold. The threshold may be set in accordance with the inspection level.

Perspective B16

There are cases where the combination of the editing level and the inspection level is not a combination recommended with respect to the type of the sheet P and the inspection matter. In this case, the setting unit 202 functions as a changing unit that changes the combination of the editing level and the inspection level. In this manner, according to the present embodiment, because the editing level and the inspection level are changed in accordance with the type of the sheet P, image inspection can be performed on a wider variety and types of sheets P. In the art, there were types of the sheet P excluded from being an inspection target. However, in the present embodiment, these types of the sheet P can be inspected.

As illustrated in FIG. 4B, and the like, the display apparatus 21 functions as a display unit that displays a plurality of inspection levels as selection candidates. The reception unit 204 and the input apparatus 22 function as a reception unit that receives the specification of a single inspection level from among the plurality of inspection levels displayed on the display unit. The changing unit (for example, the setting unit 202) changes (sets or employs) the single inspection level received by the reception unit to the inspection level of a combination. This allows the user to easily select the inspection level. The changing unit (for example, the setting unit 202) may prohibit changing the inspection level to an inspection level that is not of a recommended combination. This allows the user to avoid an erroneous inspection level that would reduce the yield rate.

As illustrated in FIG. 4B, and the like, the display apparatus 21 functions as a display unit that displays a plurality of editing levels as selection candidates. The reception unit 204 and the input apparatus 22 function as a reception unit that receives the specification of a single editing level from among the plurality of editing levels displayed on the display unit. The changing unit (for example, the setting unit 202) may change (sets or employs) the single editing level received by the reception unit to the editing level of a combination. This allows the user to easily select the editing level. The changing unit (for example, the setting unit 202) may prohibit changing the editing level to an editing level that is not of a recommended combination. This allows the user to avoid an erroneous editing level that would reduce the yield rate.

Perspectives B17 to B19

In a case when the combination of the editing level and the inspection level is not a recommended combination with respect to the type of sheet and the inspection matter received by the reception unit, the CPU 201 may output warning information. As illustrated in FIG. 16, the CPU 201 may output warning information and prohibit image formation by the image forming unit for image inspection. As illustrated in FIG. 17, the CPU 201 may output warning information and allow image formation by the image forming unit for image inspection.

Perspective B20

There are cases where the combination of the editing level and the inspection level is not a recommended combination with respect to the type of the sheet P and the inspection matter received by the reception unit. In this case, the display apparatus 21 may function as an output unit that outputs a message prompting the user to change the combination of the editing level and the inspection level. This allows the user to easily understand that the current combination is not a recommended combination.

Other Embodiments

Embodiment(s) of the present invention can also be realized by a computer of a system or a apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming system comprising:
an image forming apparatus configured to form an image on a sheet;
a reading apparatus to read the image on the sheet conveyed from the image forming unit; and one or more processors configured:
to apply image processing to first image data obtained by the reading apparatus reading the image on the sheet, the image processing being a processing in which a density of an image represented by the first image data is reduced, and a reduction amount of the density by the image processing in a case when an image processing level in the image processing is set to a first image processing level being less than a reduction amount of the density by the image processing in a case when the image processing level is set to a second image processing level; and
to inspect the image on the sheet, using an inspection level set by the one or more processors, based on the first image data to which the image processing has been applied using the image processing level set by the one or more processors and second image data corresponding to a reference image,
wherein the one or more processors inspect the image on the sheet using the image processing level set to the first image processing level and the inspection level set to a first inspection level and do not inspect the image on the sheet using the image processing level set to the first image processing level and the inspection determination level set to a second inspection level higher than the first inspection level.

2. The image forming system according to claim 1, further comprising a display unit configured to display a screen for receiving an input of a setting for the image processing level and the inspection level,
wherein the one or more processors prohibit the second inspection level from being selected on the screen and allow the first inspection level to be selected on the screen in a case when the image processing level is set to the first image processing level.

3. The image forming system according to claim 1, further comprising a display unit configured to display a screen for receiving an input of a setting for the image processing level and the inspection level, and
wherein the one or more processors prohibit the first image processing level and the second image processing level from being selected on the screen in a case when the inspection determination level is set to the second inspection level.

4. The image forming system according to claim 1, further comprising a display unit configured to display a screen for receiving an input of an instruction to start reading the image on the sheet by the reading apparatus and inspecting the image on the sheet,
wherein the one or more processors prohibit the instruction from being input unit in a case when the image processing level is set to the first image processing level and the inspection level is set to the second inspection level, and
wherein the one or more processors allow the instruction to be input in a case when the image processing level is set to the first image processing level and the inspection level is set to the first inspection level.

5. The image forming system according to claim 1, further comprising a notification unit configured to notify a user of information,
wherein the notification unit notifies the user prompting the user to change the image processing level and/or the inspection level in a case when the image processing level is set to the first image processing level and the inspection level is set to the second inspection level.

6. The image forming system according to claim 1, wherein the sheet is embossed paper with recesses and protrusions on a surface.

7. The image forming system according to claim 1, wherein the second image data is image data obtained by the reading apparatus reading an image on a sheet on which the image has been formed by the image forming apparatus,
wherein the one or more processors inspect the image on the sheet based on the first image data to which the image processing has been applied and the second image data to which the image processing has been applied, using the inspection level set by the one or more processors.

8. The image forming system according to claim 1, wherein the one or more processors discriminate the inspected sheet as a sheet satisfying a pass criterion in a case when a distance between an image corresponding to the second image data and an image corresponding to the first image data to which the image processing has been applied is less than a reference distance corresponding to the inspection level set by the one or more processors,
wherein the one or more processors, in a first inspection processing, discriminate the inspected sheet as a sheet being a failure in a case when the distance between the image corresponding to the second image data and the image corresponding to the first image data to which the image processing has been applied is greater than the reference distance corresponding to the inspection level set by the one or more processors.

9. The image forming system according to claim 1, wherein the one or more processors discriminate the inspected sheet as a sheet satisfying a pass criterion in a case when of a noise image not existing in an image corresponding to the second image data and in an image corresponding to the first image data to [[on]] which the image processing has been applied is less than a reference size corresponding to the inspection level set by the one or more processors,
wherein the one or more processors discriminate the inspected sheet as a sheet being a failure in a case when the size of a noise image not existing in an image corresponding to the second image data and in an image corresponding to the first image data to which the image processing has been applied is greater than the reference size corresponding to the inspection level set by the one or more processors.

10. The image forming system according to claim 1, wherein the image processing is a processing in which a density of a first image area in the image represented by the first image data is reduced in a case when the density of the first image area is less than a predetermined value, and a density of a second image area in the image represented by the first image data is not reduced in a case when the density of the second image area is greater than the predetermined value.

11. The image forming system according to claim 1, wherein the inspection using the second inspection level is stricter than the inspection using the first inspection level.

12. The image forming system according to claim 1, wherein the one or more processors inspect the image on the sheet using the second image processing level and the first inspection level, and inspect the image on the sheet using the second image processing level and the second inspection level.

13. The image forming system according to claim 2, wherein the one or more processors allow the second inspection level to be selected on the screen and allow the first inspection level to be selected on the screen in a case when the image processing level is set to the second image processing level.

14. The image forming system according to claim 3, wherein the one or more processors allow the first image processing level to be selected on the screen and allow the second image processing level to be selected on the screen in a case when the inspection level is set to the first inspection level.

15. The image forming system according to claim 4, wherein the one or more processors allow the instruction to be input in a case when the image processing level is set to the second image processing level and the inspection level is set to the second inspection level, and
wherein the one or more processors allow the instruction to be input in a case when the image processing level is set to the second image processing level and the inspection level is set to the first inspection level.

16. The image forming system according to claim 8, wherein the reference distance corresponding to the first inspection level is greater than the reference distance corresponding to the second inspection level.

17. The image forming system according to claim 9, wherein the reference size corresponding to the first inspection level is greater than the reference size corresponding to the second inspection level.

18. An image forming system comprising:
an image forming apparatus configured to form an image on a sheet;
a reading apparatus configured to read the image on the sheet conveyed from the image forming apparatus; and
one or more processors configured:
to apply an image processing to first image data obtained by the reading apparatus reading the image on the sheet, the image processing being a processing in which a density of an image represented by the first image data is reduced, and a reduction amount of the density by the image processing in a case when an image processing level in the image processing is set to a first image processing level being less than a reduction amount of the density by the image processing in a case when the image processing level is set to a second image processing level;
to execute a first inspection determination processing to inspect the image on the sheet, using an inspection level set by the one or more processors, based on the first image data to which the image processing has been applied using the image processing level set by the one or more processors and a second image data corresponding to a reference image; and
to execute a second inspection determination processing to inspect the image on the sheet, using an inspection level set by the one or more processors, based on the first image data to which the image processing has been applied using the image processing level set by the one or more processors and the second image data wherein the one or more processors do not execute the first inspection determination processing using with the image processing level set to the first image processing level and the inspection level set to a first inspection determination level and execute the second inspection determination processing using with the image processing level set to the first image processing level and the inspection level set to the first inspection determination level.

19. The image forming system according to claim 18, wherein the one or more processors execute the first inspection determination processing using with the image processing level set to a second image processing level and the inspection level set to the first inspection determination level and execute the second inspection determination processing using the image processing level set to the second image processing level and the inspection level set to the first inspection level.

20. The image forming system according to claim 18, wherein the one or more processors do not execute the first inspection processing using the image processing level set to the first image processing level and the inspection level set to a second inspection level higher than the first inspection level and do not execute the second inspection processing using the image processing level set to the first image processing level and the inspection level set to the second inspection level.

21. The image forming system according to claim 18, wherein the sheet is embossed paper with recesses and protrusions on a surface.

22. The image forming system according to claim 18, wherein the second image data is image data obtained by the reading apparatus reading an image on a sheet on which the image has been formed by the image forming apparatus, and
wherein the one or more processors inspect the image on the sheet based on the first image data to which the image processing has been applied and the second image data to which the image processing has been applied, using the inspection level set by the one or more processors.

23. The image forming system according to claim 18, wherein the one or more processors, in the second inspection processing, discriminate the inspected sheet as a sheet satisfying a pass criterion in a case when a distance between an image corresponding to the second image data and an image corresponding to the first image data to which the image processing has been applied is less than a reference distance corresponding to the inspection level set by the one or more processors,
wherein the one or more processors discriminate the inspected sheet as a sheet being a failure in a case when the distance between the image corresponding to the second image data and the image corresponding to the first image data to which the image processing has been applied is greater than the reference distance corresponding to the inspection level set by the one or more processors.

24. The image forming system according to claim 18, wherein the image processing is a processing in which a density of a first image area in the image represented by the first image data is reduced in a case when the density of the first image area is less than a predetermined value, and a density of a second image area in the image represented by the first image data is not reduced in a case when the density of the second image area is greater than the predetermined value.

25. The image forming system according to claim 20, wherein the inspection using the second inspection level is stricter than the inspection using the first inspection level.

26. The image forming system according to claim 20, wherein the reference distance corresponding to the first inspection level is greater than the reference distance corresponding to the second inspection level.

27. The image forming system according to claim 23, wherein the reference size corresponding to the first inspection level is greater than the reference size corresponding to the second inspection level.

* * * * *